US011875125B2

(12) United States Patent
Sabharwal et al.

(10) Patent No.: US 11,875,125 B2
(45) Date of Patent: Jan. 16, 2024

(54) SYSTEM AND METHOD FOR DESIGNING ARTIFICIAL INTELLIGENCE (AI) BASED HIERARCHICAL MULTI-CONVERSATION SYSTEM

(71) Applicant: HCL Technologies Limited, New Delhi (IN)

(72) Inventors: Navin Sabharwal, New Delhi (IN); Amit Agrawal, Mathura (IN)

(73) Assignee: HCL Technologies Limited, New Delhi (IN)

( * ) Notice: Subject to any disclaimer, the term of this patent is extended or adjusted under 35 U.S.C. 154(b) by 328 days.

(21) Appl. No.: 17/205,331

(22) Filed: Mar. 18, 2021

(65) Prior Publication Data

US 2022/0300716 A1   Sep. 22, 2022

(51) Int. Cl.
| | |
|---|---|
| *G06F 40/35* | (2020.01) |
| *G06N 20/00* | (2019.01) |
| *G06F 16/2452* | (2019.01) |
| *G06F 16/2457* | (2019.01) |
| *G06F 40/279* | (2020.01) |

(52) U.S. Cl.
CPC ........ *G06F 40/35* (2020.01); *G06F 16/24522* (2019.01); *G06F 16/24578* (2019.01); *G06F 40/279* (2020.01); *G06N 20/00* (2019.01)

(58) Field of Classification Search
CPC .. G06F 40/35; G06F 40/279; G06F 16/24522; G06F 16/24578; G06N 20/00
See application file for complete search history.

(56) References Cited

U.S. PATENT DOCUMENTS

| | | |
|---|---|---|
| 8,538,955 B2 | 9/2013 | Hu et al. |
| 8,938,463 B1 | 1/2015 | Kim et al. |
| 10,009,466 B2 | 6/2018 | Marrelli et al. |
| 10,366,168 B2 | 7/2019 | Wu |

(Continued)

FOREIGN PATENT DOCUMENTS

| | | | | |
|---|---|---|---|---|
| CA | 3104714 A1 | * | 3/2020 | ........... G06F 16/355 |
| CN | 111737439 A | * | 10/2020 | |
| WO | WO-2011145401 A1 | * | 11/2011 | ....... G06F 17/30327 |

OTHER PUBLICATIONS

Cuayáhuitl, Heriberto. Hierarchical reinforcement learning for spoken dialogue systems. Diss. The University of Edinburgh, 2009. (Year: 2009).*

(Continued)

*Primary Examiner* — Anne L Thomas-Homescu

(57) ABSTRACT

Method and system for determining a conversation system from a multi-conversation system using Artificial Intelligence (AI) is provided. The method includes receiving a user query associated with a domain and creating a hierarchical tree comprising a root node and a child node using a first pre-trained machine learning model. The method further includes traversing the hierarchical tree for a path between root node and one leaf child node to identify a topic hierarchy. The path is associated with a confidence score corresponding to mapping between user query and match data of nodes in the path. The method further includes determining a conversation system from the multi-conversation system for outputting data to answer the user query corresponding to one leaf child node of one path with a highest confidence score.

15 Claims, 16 Drawing Sheets

(56) References Cited

U.S. PATENT DOCUMENTS

| | | | |
|---|---|---|---|
| 11,120,812 B1* | 9/2021 | Shi | G06N 20/00 |
| 2019/0130305 A1* | 5/2019 | Sivertson | G06N 5/01 |
| 2019/0199658 A1 | 6/2019 | Kim et al. | |
| 2019/0297120 A1 | 9/2019 | Nallaperumal et al. | |
| 2020/0133725 A1* | 4/2020 | Thomas | G06F 9/5027 |
| 2021/0365488 A1* | 11/2021 | Chen | G06F 16/367 |
| 2021/0406913 A1* | 12/2021 | Yao | G06N 20/00 |
| 2022/0108080 A1* | 4/2022 | Munavalli | G06N 3/08 |

OTHER PUBLICATIONS

Heriberto Cuayahuitl, "Hierarchical Reinforcement Learning for Spoken Dialogue Systems".

* cited by examiner

| S.No. | Node Type 402 | Node Name 404 | Class or sub topic 406 | Training data 408 |
|---|---|---|---|---|
| 1 | Root Node | Artificial Intelligence | Machine learning, Natural Language Processing | Machine Learning:<br>- Please provide hyperparameter names for linear regression model?<br>- Please provide hyperparameter names for decision trees<br>Natural Language Processing:<br>- What are Natural Language Processing (NLP) techniques? |
| 2 | Child Node - 1 | Machine learning | Regression Models, Classification Models | Machine Learning:<br>- Please provide hyperparameter names for linear regression model?<br>- Please provide hyperparameter names for decision trees<br>Natural Language Processing:<br>- What are Natural Language Processing (NLP) techniques? |
| 3 | Child Node - 2 | Natural Language Processing | ---- | ---- |
| 4 | First child of Child node - 1 | Regression Model | ---- | ---- |
| 5 | Second child of Child node - 1 | Classification Model | ---- | ---- |

FIG. 4A

| S.No. | Variations in user query 410 | Class or Category 412 |
|---|---|---|
| 1 | Please provide hyperparameter names for linear regression model | Machine learning |
| 2 | Please provide hyperparameter names for decision trees | Machine learning |
| 3 | What are Natural Language Processing (NLP) techniques? | Natural Language Processing |

FIG. 4B

| S.No. | User ID | User Query | Conversation System ID | Confidence Score | Relevance |
|---|---|---|---|---|---|
| 1 | User 1 | Please tell me about hyperparameters in AI model | Conversation A (Machine Learning) | 0.55 | 1 |
| 2 | User 1 | Please tell me about hyperparameters in AI model | Conversation A (Natural Language Processing) | 0.58 | 0 |

| S.No. | User Query or variation 602 | Intent 604 |
|---|---|---|
| 1 | Please tell me about hyperparameters in AI model | Info |
| 2 | What are Natural Language Processing (NLP) techniques? | Info |

FIG. 6A

SYSTEM AND METHOD FOR DESIGNING ARTIFICIAL INTELLIGENCE (AI) BASED HIERARCHICAL MULTI-CONVERSATION SYSTEM

TECHNICAL FIELD

This disclosure relates generally to Artificial Intelligence (AI) technology associated with online communication, and more particularly relates to an AI based hierarchical multi-conversation system and method thereof.

BACKGROUND

Typically, many organizations work in various domains, such as, Information Technology (IT), healthcare, and legal domain. Such organizations that work in various domains may want to implement a single conversation system that can answer questions online from various domains. Currently, rule-based system for multi-conversation architecture may face limitations, such as, model training, and conflict due to similar type of use cases in various domains. Thereby, the implementation of such systems for various domains may be infeasible. In such cases, multiple conversation systems may have to be developed for each of the multiple domains. Further, identifying a user query to a certain domain may be a challenging task. In some cases, even a single conversation system may be insufficient for dealing with a single domain due to training limitations and resources. In such cases, a separate conversation system for each of sub-categories or sub-domains may be designed to cater user queries specific to a particular sub-category or a sub-domain. Furthermore, ranking of conversation systems may be unavailable.

Accordingly, there is a need for a method and a robust conversation system that can answer user queries across multiple domains.

SUMMARY

In an embodiment, a method for determining a conversation system from a multi-conversation system using AI is disclosed. The method includes receiving a user query associated with a domain from a plurality of domains and creating a hierarchical tree comprising a root node and at least one child node using a first pre-trained machine learning model. The at least one child node may be associated with match data corresponding to a topic related to the user query. The at least one leaf child node may be associated with match data corresponding to a sub-topic related to the user query. The method further includes traversing the hierarchical tree for at least one path between the root node and the at least one leaf child node to identify a topic hierarchy. The at least one path may be associated with a confidence score corresponding to mapping between the user query and the match data of nodes in the at least one path. The method further includes determining the conversation system from the multi-conversation system for outputting data to answer the user query corresponding to the at least one leaf child node of the at least one path with a highest confidence score.

In another embodiment, a system for determining a conversation system from a multi-conversation system using Artificial Intelligence (AI) is disclosed. The system may include a processor and a memory communicatively coupled to the processor. The memory may be configured to store processor-executable instructions. The processor-executable instructions, on execution, cause the processor to receive a user query associated with a domain from a plurality of domains and creating a hierarchical tree comprising a root node and at least one child node using a first pre-trained machine learning model. The at least one child node may be associated with match data corresponding to a topic related to the user query. The at least one leaf child node may be associated with match data corresponding to a sub-topic related to the user query. The processor instructions further cause the processor to traverse the hierarchical tree for at least one path between the root node and the at least one leaf child node to identify a topic hierarchy. The at least one path may be associated with a confidence score corresponding to mapping between the user query and the match data of nodes in the at least one path. The processor instructions further cause the processor to determine the conversation system from the multi-conversation system for outputting data to answer the user query corresponding to the at least one leaf child node of the at least one path with a highest confidence score.

In yet another embodiment, a non-transitory computer-readable storage medium is disclosed. The non-transitory computer-readable storage medium has computer-executable instructions stored thereon for determining a conversation system from a multi-conversation system using the AI. The computer-executable instructions may cause a computer comprising one or more processors to perform operations that includes receiving a user query associated with a domain from a plurality of domains and creating a hierarchical tree comprising a root node and at least one child node using a first pre-trained machine learning model. The at least one child node may be associated with match data corresponding to a topic related to the user query. The at least one leaf child node may be associated with match data corresponding to a sub-topic related to the user query. The operations may further include traversing the hierarchical tree for at least one path between the root node and the at least one leaf child node to identify a topic hierarchy. The at least one path may be associated with a confidence score corresponding to mapping between the user query and the match data of nodes in the at least one path. The operations may further include determining the conversation system from the multi-conversation system for outputting data to answer the user query corresponding to the at least one leaf child node of the at least one path with a highest confidence score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4A is a tabular representation of a sample dataset (training data) for classification-based machine learning models used in AI based hierarchical multi-conversation system, in accordance with an embodiment.

FIG. 4B is a tabular representation of training data with variations in user queries for classification-based machine learning models used in AI based hierarchical multi-conversation system, in accordance with an embodiment.

FIG. 5B is a tabular representation that illustrates ranking responses from conversation systems for a user query in an AI based hierarchical multi-conversation system, in accordance with an embodiment.

FIG. 6A is a tabular representation of a sample dataset (training data) for intent classification of user queries, in accordance with an embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following described implementations may be found in the disclosed system and method for determining a conversation system from a multi-conversation system using AI. In other words, multiple closed-domain conversation systems may be used together as one system and referred as AI based hierarchical multi-conversation system. The disclosed system may identify a best conversation system to answer a user query from repositories of conversation systems. The disclosed system may simulate human conversation (or "chat") through artificial intelligence. Exemplary aspects of the disclosure provide a robust conversation system that can answer user queries across multiple domains where a user may be unaware of the fact that from which conversation system a response is coming. Thereby, the disclosed system may be easy to use, user engaging and may improve user trust. The disclosed system may use pro-active learning techniques to select pairs of topics or sub-topics that may require validation from Subject matter Experts (SMEs). Therefore, the disclosed system may engage SMEs or user during training phase of the AI based hierarchical multi-conversation system.

The disclosed system may enable quick design and implementation of multiple conversation systems as a single AI based hierarchical multi-conversation system. The disclosed system may leverage transfer learning algorithms and therefore may easily integrate with new applications or software. In some cases, hierarchy may not be available for some topics or topics in particular language in lexical Database. In such cases, the disclosed system may incorporate graph-based techniques, such as Graph based Neural Networks to generate relationships between topics associated with user query. The AI based hierarchical multi-conversation system may be used in online applications that provide online help or customer service.

Figure 1:
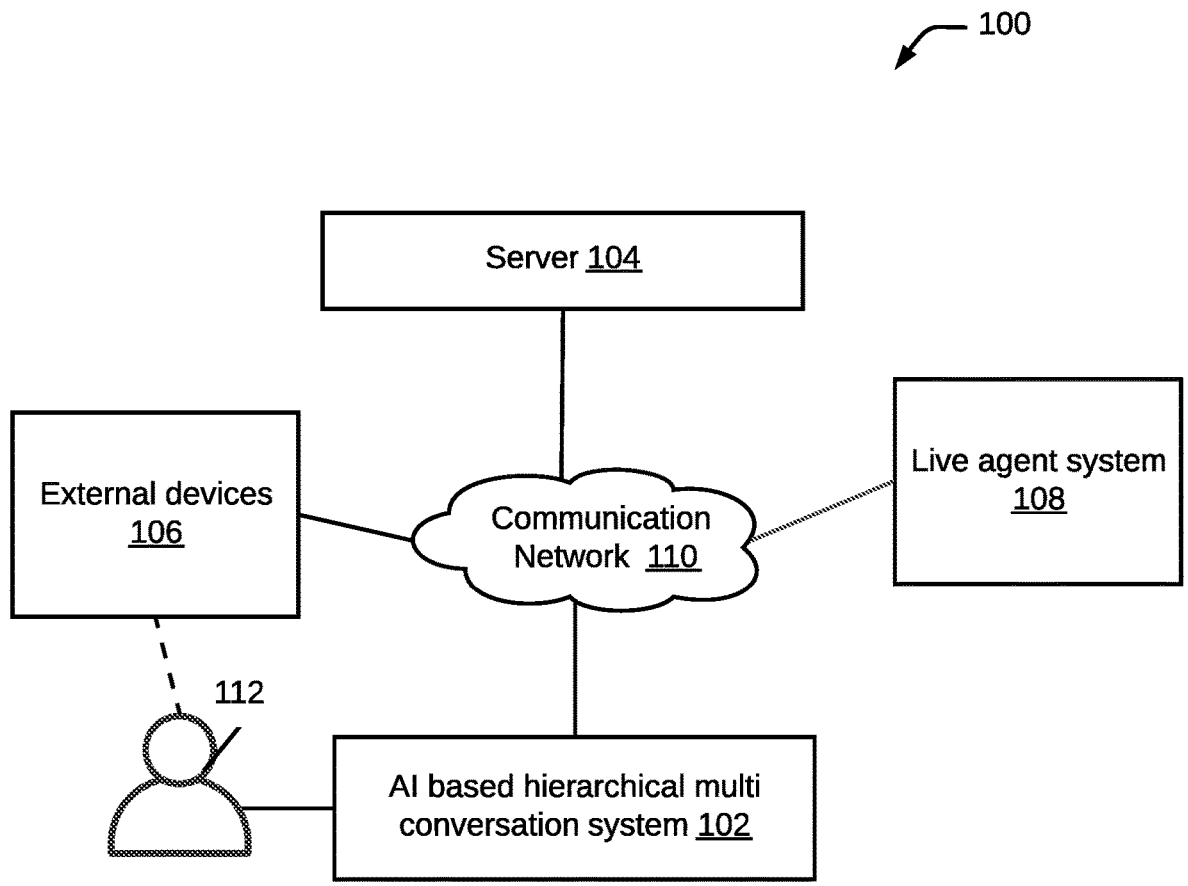
FIG. 1 is a block diagram that illustrates an environment for an Artificial Intelligence (AI) based hierarchical multi-conversation system, in accordance with an embodiment.

FIG. 1 is a block diagram that illustrates an environment for an AI based hierarchical multi-conversation system, in accordance with an embodiment. With reference to FIG. 1, there is shown an environment 100. The environment 100 includes an AI based hierarchical multi-conversation system 102, a server 104, an external device 106, a live agent system 110 and a communication network 110. A user 112 may be associated with the AI based hierarchical multi-conversation system 102. Additionally, or alternatively, the user 112 may be associated with the external device 106.

The AI based hierarchical multi-conversation system 102 may be communicatively coupled to the server 104, the external device 106 and the live agent system 110, via the communication network 110. The AI based hierarchical multi-conversation system 102 may include a machine learning model (not shown in FIG. 1), for example, as part of an application stored in memory of the AI based hierarchical multi-conversation system 102.

The AI based hierarchical multi-conversation system 102 may include suitable logic, circuitry, interfaces, and/or code that may be configured to determine a conversation system from a multi-conversation system using the AI to answer one or more user queries. The AI based hierarchical multi-conversation system 102 may be configured to answer the one or more user queries across multiple domains. The examples of multiple domains may include, but not limited to, software testing, healthcare and e-commerce. By way of example, the AI based hierarchical multi-conversation system 102 may be implemented as a plurality of distributed cloud-based resources by use of several technologies that are well known to those skilled in the art. In accordance with an embodiment, the AI based hierarchical multi-conversation system 102 may include one or more dedicated computers. Other examples of implementation of the AI based hierarchical multi-conversation system 102 may include, but are not limited to, a web/cloud server, an application server, a media server, and a Consumer Electronic (CE) device.

The server 104 may include suitable logic, circuitry, interfaces, and/or code that may be configured to store, maintain, and execute one or more software platforms and programs, such as AI programs and machine learning programs, online chat applications, and one or more databases that include historical data of answers in response to user queries (or query responses) for online interaction with one or more users, such as the user 112. Although in FIG. 1, the AI based hierarchical multi-conversation system 102 and the server 104 are shown as two separate entities, this disclosure is not so limited. Accordingly, in some embodiments, the entire functionality of the server 104 may be included in the AI based hierarchical multi-conversation system 102, without a deviation from scope of the disclosure.

The external device 106 may include suitable logic, circuitry, interfaces, and/or code that may be configured to facilitate communication of the one or more users, such as the user 112, with the AI based hierarchical multi-conversation system 102 and/or the live agent system 108. The external device 106 may be capable of communicating with the AI based hierarchical multi-conversation system 102 and the live agent system 108 via the communication network 110. The external device 106 and the AI based hierarchical multi-conversation system 102 are generally disparately located. In accordance with an embodiment, the external device 106 may be configured to transmit text-based, voice-based, and/or video-based communications to an AI entity (such as, a chat bot) stored and executed by the AI based hierarchical multi-conversation system 102 that provides answers in response to user queries.

The functionalities of the external device 106 may be implemented in portable devices, such as a high-speed computing device, and/or non-portable devices, such as an application server. Examples of the external device 106 may include, but are not limited to, a computing device, a smart phone, a mobile device, a laptop, a smart watch, an MP3 player, a personal digital assistant (PDA), an e-reader, and a tablet.

The live agent system 108 may include suitable logic, circuitry, interfaces, and/or code that may be configured to facilitate communication of human operators, such as Subject Matter Experts (SMEs) with the AI based hierarchical multi-conversation system 102. The live agent system 108 may transmit feedback messages on topic relationships generated by the AI based hierarchical multi-conversation system 102, and validation messages to select pairs of topics/sub-topics from the SMEs to the AI based hierarchical multi-conversation system 102. The topic relationships and the pairs of topics/sub-topics may be associated with domain(s) of the user query. The live agent system 108 and the AI based hierarchical multi-conversation system 102 are generally disparately located, and the exchange of messages (text-based, voice-based, and/or image-based messages) may generally occur over the communication network 110.

Although in FIG. 1, the AI based hierarchical multi-conversation system 102 and the live agent system 108 are shown as two separate entities, this disclosure is not so limited. Accordingly, in some embodiments, the entire functionality of the live agent system 108 may be included in the AI based hierarchical multi-conversation system 102, without a deviation from scope of the disclosure. In accordance with an embodiment, the entire functionality of the server 104 and the live agent system 108 may be included in the AI based hierarchical multi-conversation system 102, without a deviation from scope of the disclosure.

The communication network 110 may include a communication medium through which the AI based hierarchical multi-conversation system 102, the server 104, the external device 106 and the live agent system 108 may communicate with each other. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 110, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, a user (such as, the user 112) may conduct (via the external device 106) a text-based, voice-based, and/or video-based conversation session (for user query) with the AI based hierarchical multi-conversation system 102. In accordance with an embodiment, such conversation session between the user and the AI based hierarchical multi-conversation system 102 may be anonymous. In accordance with an embodiment, the AI based hierarchical multi-conversation system 102 may be implemented as a "chat-bot". Through the text-based, voice-based, and/or video-based conversation session, the external device 106 may transmit the user query from the user 112 to the AI based hierarchical multi-conversation system 102, and in response, the AI based hierarchical multi-conversation system 102 may select best conversation system from a repository of conversation systems across multiple domains, based on the user query. Therefore, multiple closed-domain conversation systems may be used together as one system and referred as the AI based hierarchical multi-conversation system 102. In contrast, the conventional conversation systems, may require separate conversation systems for each of sub-category or sub-domain to cater user queries specific to particular sub-category or sub-domain.

The AI based hierarchical multi-conversation system 102 may be configured to receive feedback data from users (such as, the user 112) and the SMEs associated with the live agent system 108 for the response provided by the AI based hierarchical multi-conversation system 102 to select the best conversation system. Accordingly, the AI based hierarchical multi-conversation system 102 may rank each of conversation system from the repository of the conversation systems.

When the external device 106 may transmit the user query for which no relationship between topics exists (i.e., the AI based hierarchical multi-conversation system 102 does not recognize a query response to a received user query) or incorrect relationship between the topics, based on the feedback data from the users and the SMEs, then the AI based hierarchical multi-conversation system 102 may be communicatively coupled to the live agent system 108, such that the SMEs of the live agent system 108 may provide an appropriate response for the transmitted user query. In accordance with an embodiment, the AI based hierarchical multi-conversation system 102 may be configured to identify an answer to previously unrecognized user query, and may store the answer for future query response purposes and re-train a conversation system of the AI based hierarchical multi-conversation system 102 to answer such queries in future.

Figure 2:
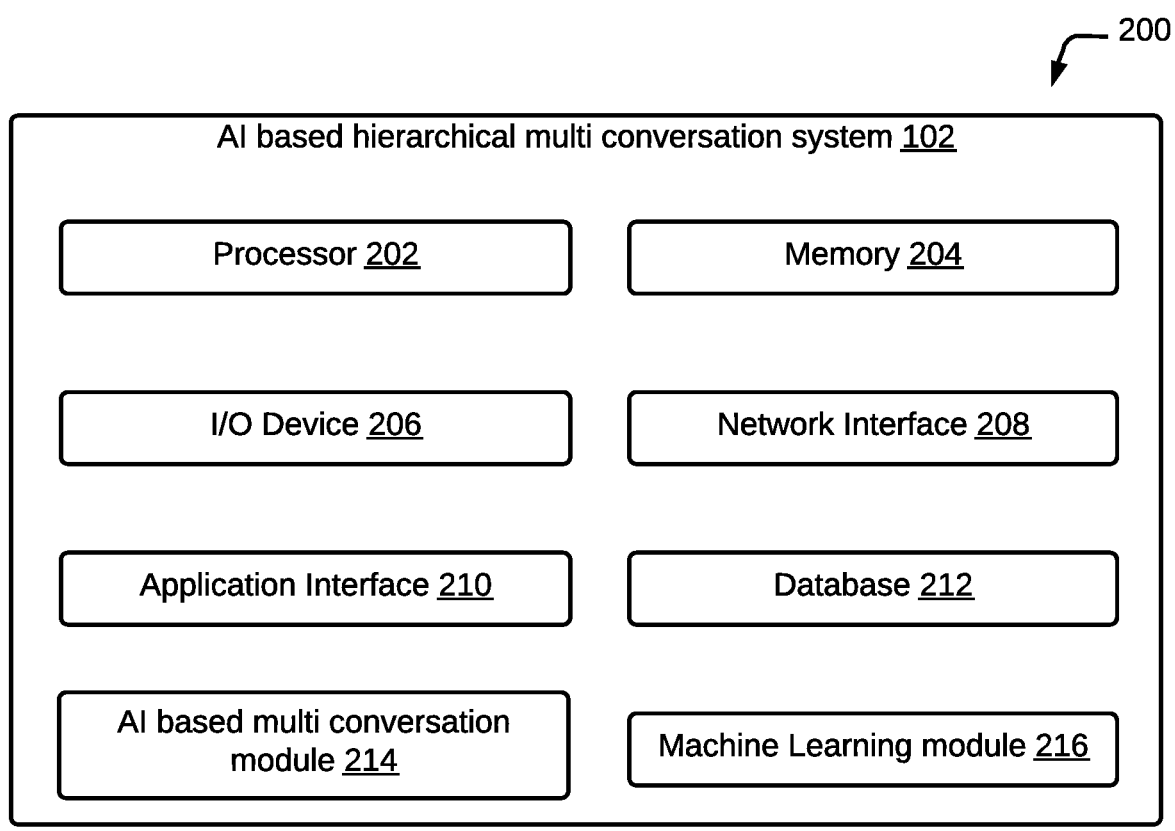
FIG. 2 is a functional block diagram that illustrates an exemplary AI based hierarchical multi-conversation system, in accordance with an embodiment.

FIG. 2 is a functional block diagram that illustrates an exemplary AI based hierarchical multi-conversation system, in accordance with an embodiment. FIG. 2 is explained in conjunction with elements from FIG. 1.

With reference to FIG. 2, there is shown a functional block diagram 200 of the AI based hierarchical multi-conversation system 102. The AI based hierarchical multi-conversation system 102 may include a processor 202, a memory 204, an input/output (I/O) device 206, a network interface 208, an application interface 210, a database 212, an AI based multi-conversation module 214 and a machine learning (ML) module 216.

The ML module 216 of the AI based hierarchical multi-conversation system 102 may include one or more machine learning models (such as, a first machine learning model, a second machine learning model and a third machine learning model), as part of, for example, a software application of the hierarchical multi-conversation system 102 that can answer queries across multiple domains. The processor 202 may be communicatively coupled to the memory 204, the I/O device 206, the network interface 208, the application interface 210, the database 212, the AI based multi-conversation module 214 and the ML module 216. In one or more embodiments, the AI based hierarchical multi-conversation system 102 may also include a provision/functionality to capture the user query via one or more external devices, for example, the external device 106.

Elements and features of the AI based hierarchical multi-conversation system 102 may be operatively associated with one another, coupled to one another, or otherwise configured to cooperate with one another as needed to support the desired functionality, as described herein. For ease of illustration and clarity, the various physical, electrical, and logical couplings and interconnections for the elements and the features are not depicted in FIG. 2. Moreover, it should be appreciated that embodiments of AI based hierarchical multi-conversation system 102 will include other elements, modules, and features that cooperate to support the desired functionality. For simplicity, FIG. 2 only depicts certain elements that relate to the techniques described in more detail below.

The processor 202 may include suitable logic, circuitry, interfaces, and/or code that may be configured to process user queries, such as, text based, audio based, and audio-visual based communications, using natural language processing (NLP) techniques, video analytics techniques, object content recognition (OCR) techniques. The processor 202 may be implemented based on a number of processor technologies, which may be known to one ordinarily skilled in the art. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof. The processor 202 may be communicatively coupled to, and communicates with, the memory 204.

The memory 204 may include suitable logic, circuitry, and/or interfaces that may be configured to store instructions executable by the processor 202. Additionally, the memory 204 may be configured to store program code of one or more machine learning models and/or the software application that may incorporate the program code of the one or more machine learning models. The memory 204 may be configured to store any received data or generated data associated with storing, maintaining, and executing the AI based hierarchical multi-conversation system 102 used to conduct text-based, voice-based, and/or video-based online conversation with one or more users (such as, the user 112). Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O interface between a user (such as, the user 112) and the AI based hierarchical multi-conversation system 102. The I/O device 206 may act as an I/O interface between an SME of the live agent system 108 and the AI based hierarchical multi-conversation system 102. The I/O device 206 may include various input and output devices, which may be configured to communicate with different operational components of the AI based hierarchical multi-conversation system 102. The I/O device 206 may be configured to communicate data between the AI based hierarchical multi-conversation system 102 and one or more of the server 104, the external device 106 and the live agent system 108.

The I/O device 206 may act as an I/O interface between a user (such as, the user 112) and the AI based hierarchical multi-conversation system 102. As described in more detail below, data received by the I/O device 206 may include, without limitation: text-based, voice-based, and/or video-based messages from a user (such as, the user 112) as a user query and/or the live agent system 108, and other data compatible with the AI based hierarchical multi-conversation system 102. Data provided by the I/O device 206 may include, without limitation, user query response(s), and the like. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to facilitate different components of the AI based hierarchical multi-conversation system 102 to communicate with other devices, such as the server 104, the external device 106 and the live agent system 108, in the environment 100, via the communication network 110. The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured as a medium for a user (such as the user 112) to interact with the AI based hierarchical multi-conversation system 102 and/or an SME via the live agent system 108 to interact with the AI based hierarchical multi-conversation system 102. The application interface 210 may be configured to have a dynamic interface that may change in accordance with preferences set by the user (such as the user 112) and configuration of the AI based hierarchical multi-conversation system 102. In some embodiments, the application interface 210 may correspond to a user interface of one or more applications installed on the AI based hierarchical multi-conversation system 102.

For communications between the AI based hierarchical multi-conversation system 102 and a user (such as the user 112), the application interface 210 may use text application interfaces, audio call application interfaces, and video call application interfaces. For communications between the AI based hierarchical multi-conversation system 102 and an SME, the application interface 210 may use live agent text application interfaces.

The database 212 may include suitable logic, circuitry, and/or interfaces that may be configured to store program instructions executable by the processor 202, the AI based multi-conversation module 214, the ML module 216, operating systems, and/or application-specific information, such as logs and application-specific databases. The database 212 may include a computer-readable storage media for carrying or having computer-executable instructions or data structures stored thereon. Such computer-readable storage media may include any available media that may be accessed by a general-purpose or special-purpose computer, such as the processor 202, the AI based multi-conversation module 214 and the ML module 216.

The database 212 may store received user query associated with a domain. The database 212 may include a plurality of stored responses (historical conversation data) for similar queries of the user query received by the AI based hierarchical multi-conversation system 102. The database 212 may store resolution rate data, feedback data from one or more experts (also referred as SMEs) to check relevancy of generated relationship between various topics and sub topics. In accordance with an embodiment, the database 212 may store training data associated with machine learning models. The database 212 may generally be stored in the memory 204, and may be accessed and searched by the AI based multi-conversation module 214 in response to a user query.

By way of example, and not limitation, the database 212 may use computer-readable storage media that includes tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

The AI based multi-conversation module 214 may include suitable logic, circuitry, and/or interfaces that may be configured to implement and use one or more AI entities, such as "chat bots", to interact with a user, such as the user 112, via a text-based, voice-based, and/or video-based conversation feature of any appropriate communication platform. As used herein, the AI based hierarchical multi-conversation system 102 may be defined as a computer program that simulates human conversation (or "chat") through artificial intelligence. The AI based multi-conversation module 214 may implement one or more chat bots to interact with any communication platform or chat product or service, such as, Facebook Messenger, Twitter, Slack, Telegram, Alexa, Skype, or any other text messaging platform. The AI based multi-conversation module 214 may be configured to determine a conversation system from a multi-conversation system for outputting data to answer the user query. The AI based multi-conversation module 214 may be further configured to rank each of the conversation system from the multi-conversation system to output data.

The machine learning module 216 may include suitable logic, circuitry, and/or interfaces that may be configured to create a hierarchical tree that includes a root node and at least one child node using a first pre-trained machine learning model. The first pre-trained machine learning model may correspond to a classification machine learning model, such as, but not limited to, Long-Short-Term-Memory (LSTM) based models and Gated Recurring Units (GRU) based models. The at least one child node may be associated with match data corresponding to a topic related to the user query. The at least one leaf child node may be associated with match data corresponding to a sub-topic related to the user query. The machine learning module 216 may be configured to traverse the hierarchical tree for at least one path between the root node and the at least one leaf child node to identify a topic hierarchy. The at least one path may be associated with a confidence score corresponding to mapping between the user query and the match data of nodes in the at least one path. The mapping between the user query and the match data of nodes in the at least one path may be as per the relevancy of the user query to the topic at nodes in the at least one path.

The machine learning module 216 may be configured to generate a relationship between a first topic associated with a first child node and a second topic associated with a second child node to identify the topic hierarchy, using a second pre-trained machine learning model. In accordance with an embodiment, the second pre-trained machine learning model may correspond to a graph based neural network model. The machine learning module 216 may be configured to compute for each of the at least one path, the confidence score, based on a third pre-trained machine learning model. In accordance with an embodiment, the third pre-trained machine learning model may correspond to a ranking based machine learning model, such as, but not limited to, RankNet.

The machine learning module 216 may facilitate progressive performance improvement of the AI based hierarchical multi-conversation system 102. This is typically performed by examining output data based on input data to determine the effect of the input data on the output data. Thereafter, various algorithms associated with machine learning models (such as, the first pre-trained machine learning model, the second pre-trained machine learning model and the third pre-trained machine learning model) may adjust the processing of the input data to result in desired output data.

In practice, the AI based multi-conversation module 214, the machine learning module 216, and/or the application interface 210 may be implemented with (or cooperate with) the at least one processor 202 to perform at least some of the functions and operations described in more detail herein. In this regard the AI based multi-conversation module 214, the machine learning module 216, and/or the application interface 210 may be realized as suitably written processing logic, application program code, or the like.

Figure 3A:
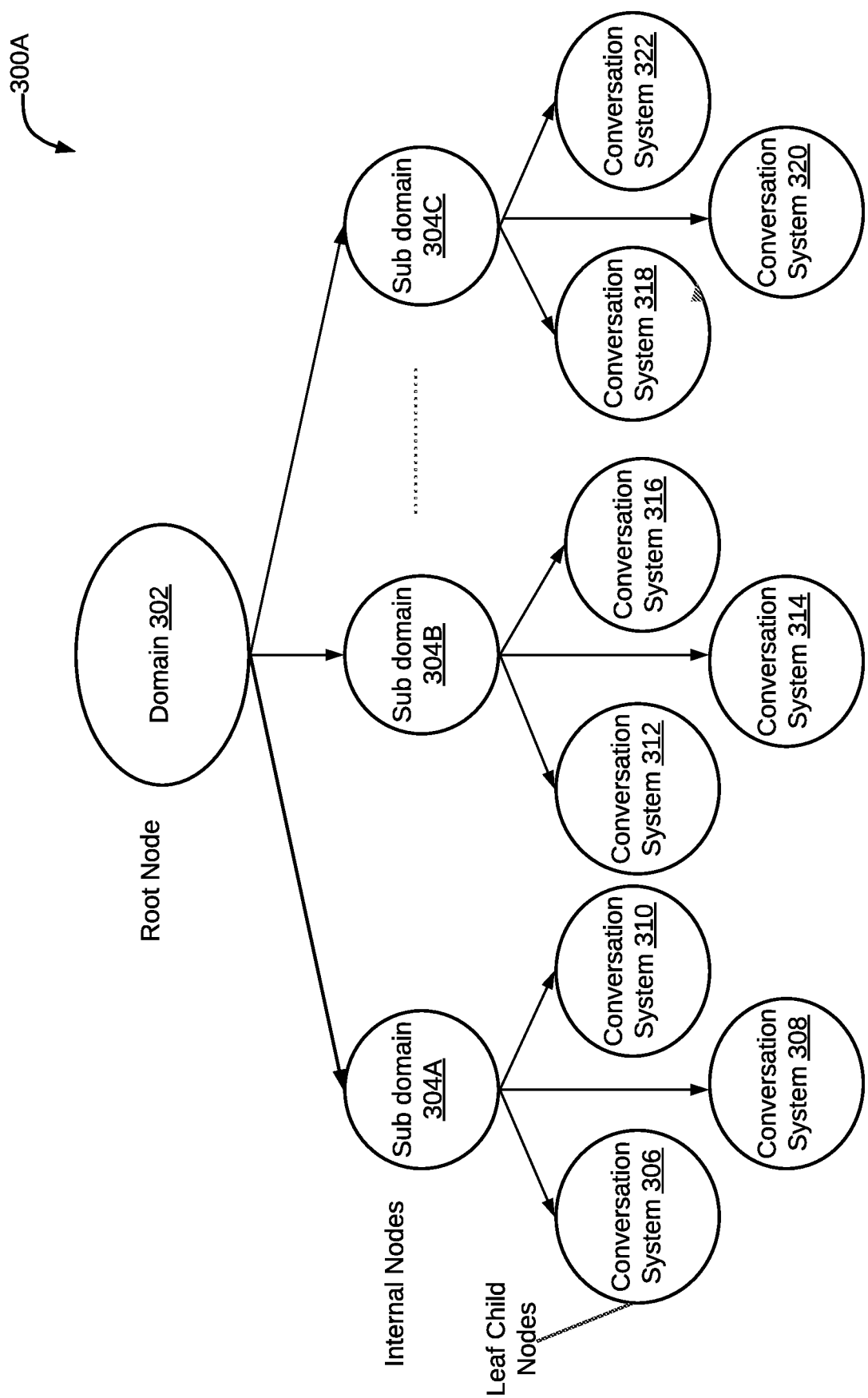
FIGS. 3A and 3B are functional block diagrams that illustrate creation of hierarchical tree for AI based hierarchical multi-conversation system, in accordance with an embodiment.
Figure 3B:
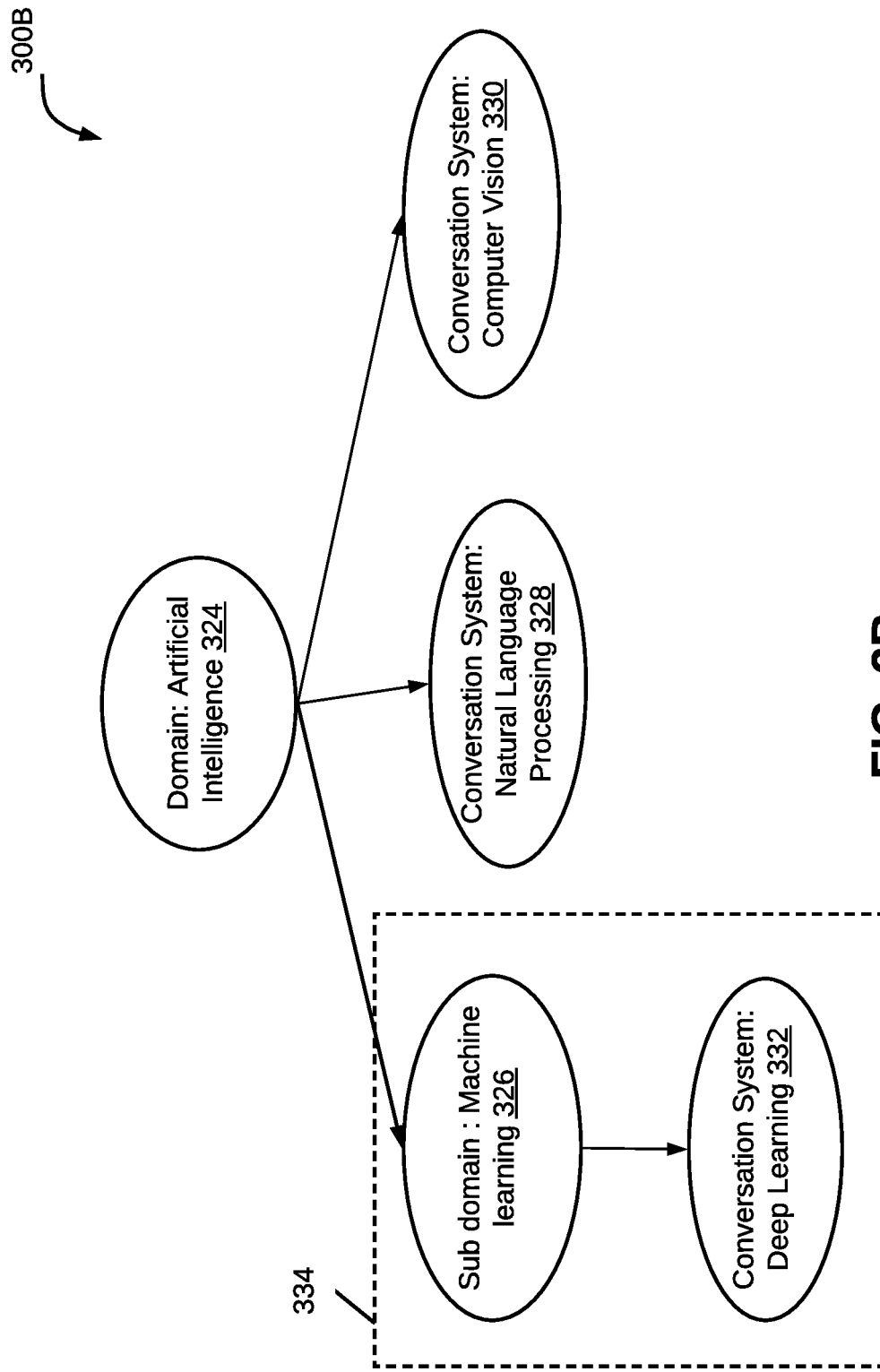

FIGS. 3A and 3B are functional block diagrams that illustrate creation of hierarchical tree for AI based hierarchical multi-conversation system, in accordance with an embodiment. FIGS. 3A and 3B are explained in conjunction with elements from FIG. 1 and FIG. 2. With reference to FIG. 3A, there is shown a hierarchical tree 300A with a root node (labelled as domain 302), three child nodes or internal nodes (labelled as sub domain 304A-304C) and leaf child nodes (labelled as conversation system (CS) 306-322).

The AI based hierarchical multi-conversation system 102 may be configured to receive a user query associated with a domain from a plurality of domains. In accordance with an embodiment, the user query may be stored in the database 212. The AI based multi-conversation module 214 of the AI based hierarchical multi-conversation system 102 may be configured to process corpus of documents (stored in the database 212) associated with a particular topic (e.g., Artificial Intelligence) to extract relevant words, tokens, keywords or phrases. The relevant words, tokens, keywords or phrases may be extracted using word embedding techniques, such as, but not limited to, GloVe, and Word2Vec.

The AI based hierarchical multi-conversation system 102 may be configured to create the hierarchical tree 300A that includes the root node (labelled as domain 302), three child nodes or internal nodes (labelled as sub domain 304A-304C) and leaf child nodes (labelled as conversation system (CS) 306-322) using a first pre-trained machine learning model to identify hierarchy for each of topic or sub-topic associated with the user query. The first pre-trained machine learning model may correspond to a classification-based machine learning model, such as, but not limited to, Long-Short-Term-Memory (LSTM) based models and Gated Recurring Units (GRU) based models.

In accordance with an embodiment, to identify the hierarchy for each of the topic or the sub-topic, the AI based hierarchical multi-conversation system 102 may use any lexical library in a particular language. For example, for the topic "Artificial Intelligence", WordNet (lexical database in English language) provides a list of topics under "Artificial Intelligence". The list of topics may include "Machine Learning", "Natural Language Processing", and "Deep Learning". Such lexical database may be represented in form of Graphs where details of one topic may be represented by a path from the topic (root node) to a leaf child node in a graph or the hierarchical tree 300A. Therefore, "Deep learning" may be a sub-topic of "Machine learning" as shown in FIG. 3B.

At root node 302, the user query may be classified into a topic, a domain, a class or a category. The classification-based machine learning model may be leveraged by the AI based hierarchical multi-conversation system 102 to classify the user query into particular sub domain or sub topic at 304A to 304C.

The at least one child node (from sub domain 304A-304C) may be associated with match data corresponding to the domain or the topic related to the user query represented at the root node 302. Each internal node (from sub domain 304A-304C) may implement the classification-based machine learning model to classify next sub topic or sub domain for the user query. The at least one leaf child node from 306 to 322 may be associated with match data corresponding to the sub domain or the sub topic (from 304A-304C) related to the user query (302). The leaf child node from 306 to 322 may represent multiple conversation systems.

The user query may traverse from the root node 302 to one of the internal nodes (304A-304C) and then to one of the leaf child nodes (306 to 322) to determine a conversation system that may answer the user query. All nodes except the leaf child nodes (306 to 322) may have topic or category classification system (first pre-trained machine learning model) implemented. One of the leaf nodes from the leaf nodes (306 to 322) may represent a conversation system from multi-conversation system that should be used to answer the user query.

In some embodiments, hierarchy may not be available for some topics or topics in a particular language in the lexical database. In such embodiments, the AI based hierarchical multi-conversation system 102 may incorporate graph-based techniques, such as, Graph based Neural Network models to generate relationships between topics associated with the user query.

With reference to FIG. 3B, there is shown a hierarchical tree 300B with a root node (labelled as domain 324), one child node or internal node (labelled as sub domain 326) and leaf child nodes (labelled as conversation system (CS) 328-332).

In an exemplary embodiment, the AI based hierarchical multi-conversation system 102 receives a user query to answer AI domain related questions. Since AI domain may have many sub-fields such as, but not limited to, Machine Learning, Natural Language Processing, and Deep Learning, therefore, all respective user queries may be answered by respective domains. As an example, for the user query "how many numbers of layers are required to implement neural network?", the user query may be traversed to a conversation system that answers deep-learning related questions. In such a case, the afore-mentioned user query may start from the root node 324 of the hierarchical tree 300B. The machine learning module 216 may classify question asked in the user query into "Artificial Intelligence" domain. The machine learning module 216 may classify, at node 324, question asked in the user query to a "Machine learning" category followed by classification, at node 326, to a "deep-learning" category and may be answered from deep-learning conversation system 332.

In some embodiments, the hierarchical tree 300B may be a sub-tree of a larger system that deals with multiple domains where Artificial Intelligence is one of the domains configured in the AI based hierarchical multi-conversation system as shown in FIG. 3B. For example, the "machine learning" internal node 326 and the "deep learning" leaf child node 332 constitute as a sub tree 334 for the hierarchical tree 300B. The leaf child nodes may correspond to a lowest level of the hierarchical tree 300B and represented with a conversation system.

In accordance with an embodiment, the conversation system at a leaf child node (such as, the conversation system 332) may be implemented using cognitive chatbot services provided by various cloud vendors, such as, but not limited to, IBM Watson Assistant, Microsoft LUIS, Amazon LEX. In some embodiments, the AI based hierarchical multi-conversation system 102 may also implement custom conversation system based on Neural Network approaches, such as, but not limited to, LSTM, LSTM-GRU, LSTM-GRU with attention models.

FIG. 4A is a tabular representation for sample dataset (training data) for classification-based machine learning models used in AI based hierarchical multi-conversation system, in accordance with an embodiment. FIG. 4A is explained in conjunction with elements from FIG. 1 to FIG. 3B. With reference to FIG. 4A, there is shown a tabular representation 400A having columns, namely, node type 402, node name 404, class or sub topics 406 and training data 410.

The AI based hierarchical multi-conversation system 102 may be configured to create the hierarchical tree 300A that includes a root node, one or more child nodes (also referred as internal nodes) and one or more leaf child nodes using a first pre-trained machine learning model to identify hierarchy for each of topic or sub-topic associated with the user query as illustrated in FIG. 3A. The AI based hierarchical multi-conversation system 102 may be configured to traverse the hierarchical tree 300A for at least one path between the root node and the at least one leaf child node to identify a topic hierarchy.

In accordance with an embodiment, the machine learning module 216 may use classification-based machine learning model for at least one leaf child node in the hierarchical tree where a user query may be classified to relevant topics/sub topics. However, in some embodiments, the AI based hierarchical multi-conversation system 102 may be configured to provide a graphical user interface (GUI) from the live agent system 108 where one or more SMEs can provide variations for each of topics/sub topics to the AI based hierarchical multi-conversation system 102.

The training data 408 is provided as the tabular representation 400A for training of classification-based machine learning model (also referred as first pre-trained machine learning model) used in AI based hierarchical multi-conversation system 102. For example, the user query "Please provide hyperparameter names for linear regression model?" in training data 408 is mapped to a category/sub topic 406 of "regression models" under topic or node name 404 of "machine learning models".

Also, for a user query associated with "Artificial Intelligence" (topic under node name 404), the machine learning module 216 may classify the user query into Machine Learning or Natural Language Processing (sub topic 406). The first pre-trained machine learning model may be implemented on a child node (Child Node-1) with a label "Machine Learning" and classifies each query that is coming to the child node into "regression models" or "classification models".

Last three entries (child node 2, first child node of child node 1 and second child node of child node 1) of the tabular representation 400A may have no further class or category and therefore no data points corresponding to the last three entries are shown. Hence, the last three entries may represent leaf child nodes in the hierarchical tree. Each of the last three entries may represent a conversation system that receives the user query and respond back with a user response. As an example, a user query "Please provide hyperparameter names for linear regression model?" may traverse from a root node (the user query may be classified into machine learning) to a child node with a label "Machine Learning" (where the user query may be further classified into regression models). Hence, answer to the user query may be outputted from a conversation system that has been labelled as "Regression Models". In accordance with an embodiment, the classification-based machine learning models may be trained on multi-label or multi-class depending on type of implementation.

In some embodiments, the AI based hierarchical multi-conversation system 102 may leverage previous conversations with users to generate the training data 408 (or conversation data) for topic classification and conversation systems of the multi-conversation system. The conversation data may exist in any of conversation systems, such as, MS Teams, Skype, and Facebook Messenger. In accordance with an embodiment, the AI based hierarchical multi-conversation system 102 may use rule based or AI based method (Entity Recognition) to remove/mask confidential information, such as, email-id, name, contact number, and address in the conversation system. Thereafter, masked conversation may be processed by the AI based hierarchical multi-conversation system 102 to identify the user query. In accordance with an embodiment, the AI based hierarchical multi-conversation system 102 may be configured to use extracted queries from previous conversations to implement any clustering approach, such as, but not limited to, Density-based clustering and hierarchical clustering for generation of clusters out of the conversation data. Canonical queries (few queries from each cluster) may be selected and displayed to SMEs using GUI.

One or more of the SMEs associated with the live agent system 108 may classify canonical queries into topics. Information associated with the canonical queries may be used by the AI based hierarchical multi-conversation system 102 to train learning algorithms in the machine learning module 216 to classify un-labelled queries under same cluster. Such step may be executed iteratively until the machine learning module 216 has sufficient number of labelled training data available.

In some embodiments, the first pre-trained machine learning model (classification-based machine learning model) in the machine learning module 216 may be unsure of topic associated with the user query because of insufficient information present in the user query. For example, for the user query "Please tell me about hyperparameters in AI models", the AI based hierarchical multi-conversation system 102 may be unsure of whether the user query belongs to Machine Learning model or Natural Language Processing model. The classification-based machine learning model in the machine learning module 216 at root node may provide nearly same confidence score for both categories i.e., 0.55 for Machine Learning model and 0.58 for Natural Language Processing model respectively. Therefore, the AI based hierarchical multi-conversation system 102 may ask a follow up question, that is, "What type of models are you talking about? Machine Learning or Natural Language Processing." using the I/O devices 206. Thereafter, based on user's selection query, the first pre-trained machine learning model (classification-based machine learning model) in the machine learning module 216 may traverse to next node in at least one path of the hierarchical tree to further identify one of a new topic, a sub-topic or a conversation system.

In some embodiments, it may be possible that disambiguation mentioned above (unsure of topic associated with the user query) may end up with more than one conversation system. For example, for same user query, when the user is unsure of an option to select, the machine learning module 216 may be configured to fetch an answer from both conversation systems and combine them to present an answer to the user (such as, the user 112). Then, the user may select whatever answer is relevant and may proceed further.

FIG. 4B is a tabular representation of training data with variations in user queries for training classification-based machine learning models used in AI based hierarchical multi-conversation system, in accordance with an embodiment. FIG. 4B is explained in conjunction with elements from FIG. 1 to FIG. 4A. With reference to FIG. 4B, there is shown a tabular representation 400B having columns, namely, variations in user query 410 and class/category 412.

Referring to FIG. 4B, training data is provided as the tabular representation 400B for training of first pre-trained machine learning model (classification-based machine learning model) used in AI based hierarchical multi-conversation system 102. In accordance with an embodiment, the variations in query 410 may be represented in textual form. Such variations may be processed using NLP based algorithms.

The machine learning module 216 of the AI based hierarchical multi-conversation system 102 may be configured to process each of variations (such as, variations in query 410) into vector representation forms. In accordance with an embodiment, sentence embedding techniques, such as, but not limited to, Universal Sentence Encoder, Bidirectional Encoder Representations from Transformations (BERT) may be used by the machine learning module 216 to process each of variations into vector representation forms as shown in FIG. 4C.

Figure 4C:
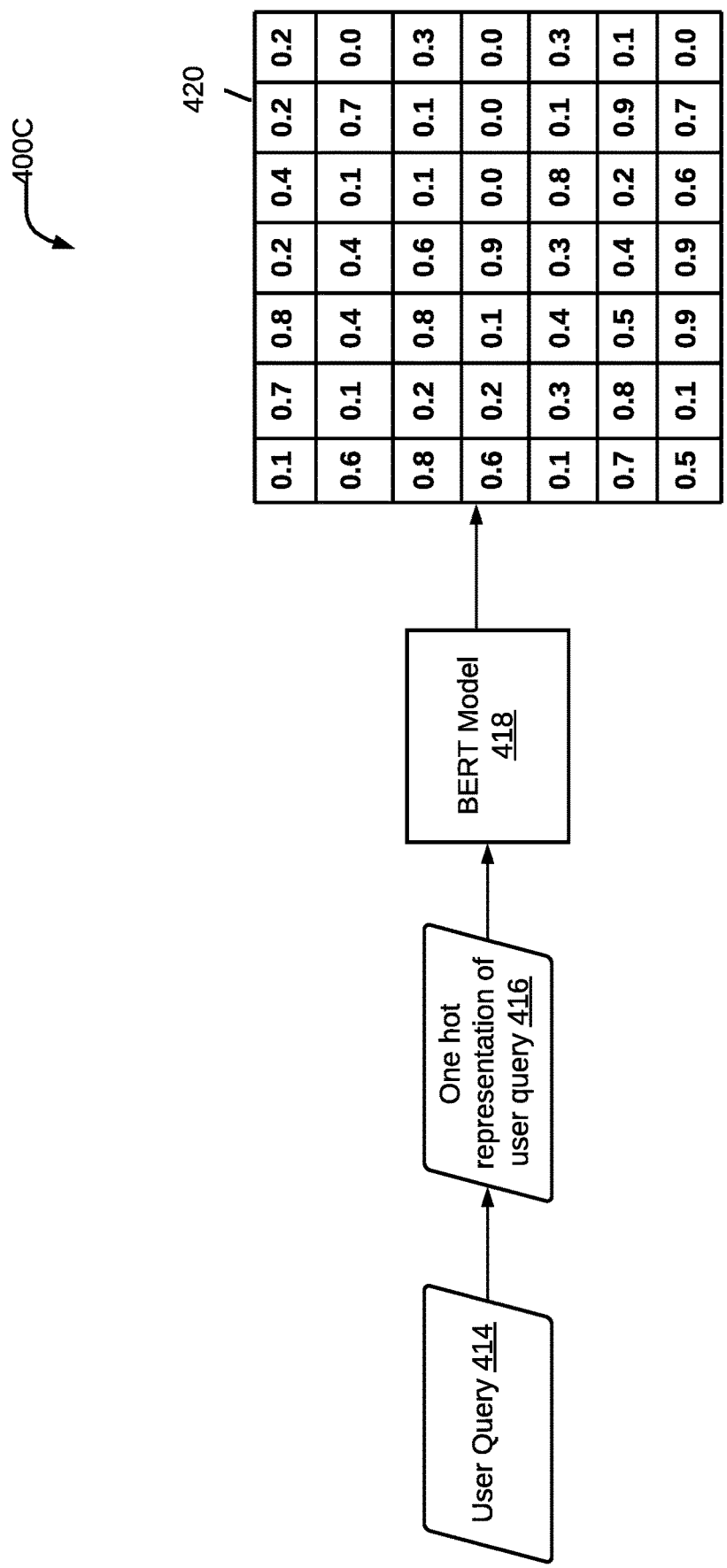
FIG. 4C is a block diagram of generation of vector representation using BERT model, in accordance with an embodiment.

FIG. 4C is a block diagram of generation of vector representation of user queries using BERT model, in accordance with an embodiment. FIG. 4C is explained in conjunction with elements from FIG. 1 to FIG. 4B. With reference to FIG. 4C, there is shown a user query 414, one hot representation of user query 416, a BERT (Bidirectional Encoder Representations from Transformers) model 418 and an embedded vector representation 420.

The machine learning module 216 of the AI based hierarchical multi-conversation system 102 may be configured to process the user query 414 into one hot representation 416 of user query that may be fed to the BERT model 418. The BERT model 418 may be configured to output the embedded vector representation 420 of the user query 416. Similarly, the BERT model 418 may be configured to output the embedded vector representation 420 of training data associated with variations in user queries 410. Once vector representations of variations are available, the AI based hierarchical multi-conversation system 102 may leverage any Neural Network based method, such as, but not limited to, LSTM, and GRU with attention to provide emphasis on information that user is looking for. For example, attention may be given more on phrase "linear regression models" than "decision trees" for hyperparameter names in the tabular representation 400B The AI based hierarchical multi-conversation system 102 may use any of performance metrices, such as, but not limited to, Precision, Recall, and F1-score to measure performance of classification-based machine learning model. In some embodiments, the AI based hierarchical multi-conversation system 102 may employ the machine learning module 216 to perform hyperparameter tuning to find optimal model for data provided to the AI based hierarchical multi-conversation system 102 and any algorithm may be used for hyperparameter tuning. Examples of such algorithms may include, but not limited to, grid search or random search to find set of values for hyperparameters.

Figure 5A:
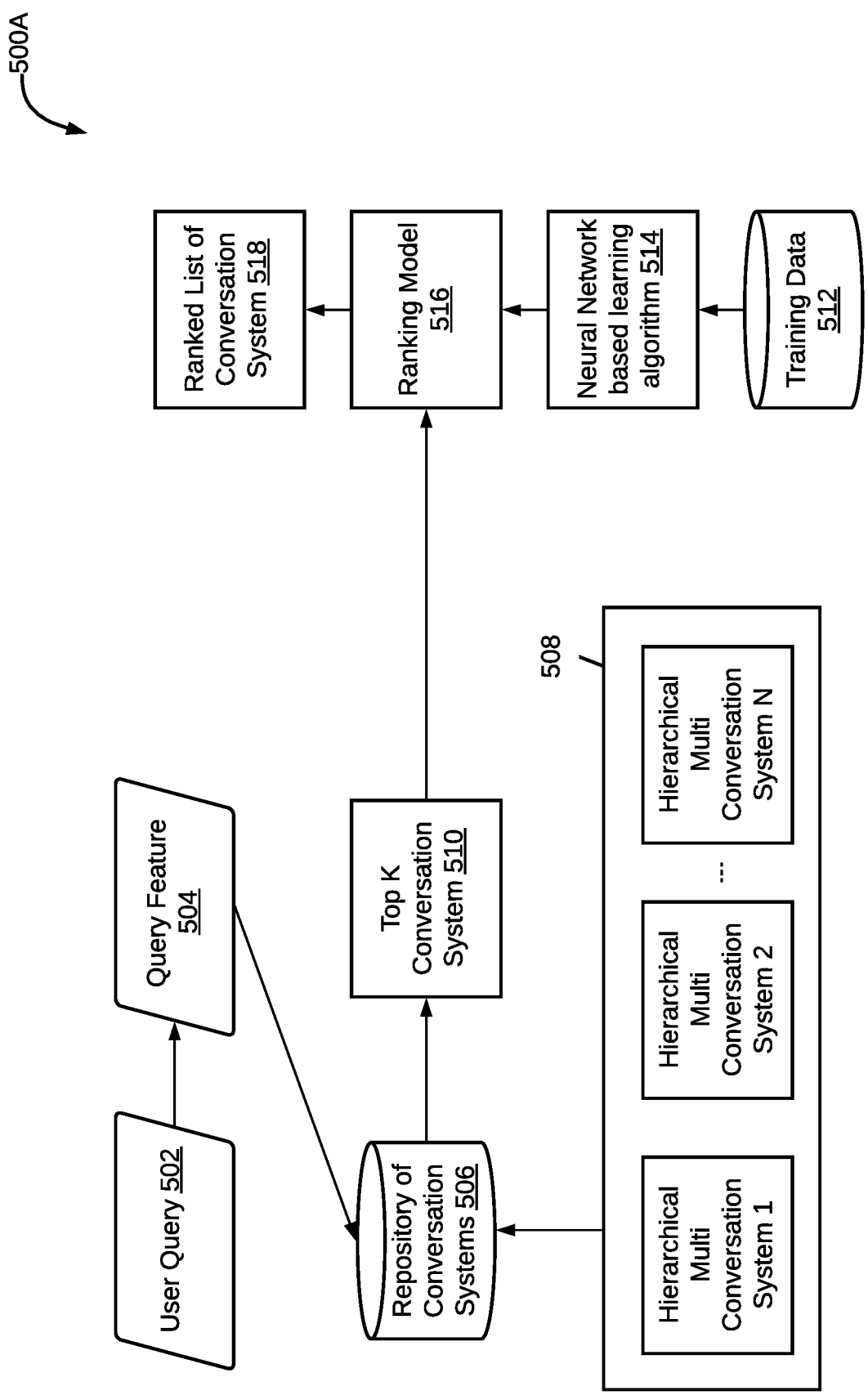
FIG. 5A is a block diagram that illustrates a ranking model for one or more AI based hierarchical multi-conversation systems for ranking responses from conversation systems for a user query, in accordance with an embodiment.

FIG. 5A is a block diagram that illustrates a ranking model for one or more AI based hierarchical multi-conversation systems for ranking responses from conversation systems for a user query, in accordance with an embodiment. FIG. 5A is explained in conjunction with elements from FIG. 1 to FIG. 4C.

With reference to FIG. 5A, there is shown a block diagram 500A with blocks, viz., user query 502, query feature 504, repository of conversation systems 506, top K conversation systems 510, a plurality of AI based hierarchical multi-conversation systems 508 (also referred as, hierarchical multi conversation system 1, hierarchical multi conversation system 2 up to hierarchical multi conversation system N), training data 512, Neural Network (NN) based learning algorithm 514, ranking model 516, ranked list of conversation systems 518 as described herein.

In accordance with an embodiment, the machine learning module 216 may be configured to train a third machine learning model using a ranking algorithm. The third machine learning model may correspond to the ranking model 516 that may re-rank order of results from plurality of AI based hierarchical multi-conversation systems 508 to provide the ranked list of conversation systems 518 to the AI based hierarchical multi-conversation system 102. In accordance with an embodiment, the ranked list of conversation systems 518 may be rendered on the live agent system 108 and/or the external device 104. Such re-rank order of results may be based on selection done by users previously for similar type of user query, such as the user query 502. In accordance with an embodiment, the user query 502 may be converted to query feature 504 using the BERT model 418. Such query feature 504 may be fed to the repository of conversation systems 506 that outputs the top K conversation systems 510.

Further, based on the training data 512, for a user query, Natural Language Processing (conversation system) may be shown to a user as a first option and machine learning (conversation system) may be shown to the user as a second option, as shown in FIG. 5B. However, with use of the ranking model 516, order from top K conversation systems 510 may be reversed because users from one organization may follow same type of actions due to several reasons (such as, organization policies). However, in some embodiments, the training data 512 may include more attributes or features, such as, SMEs feedback may be used to generate ranking associated with the user query. Such SMEs feedback may be useful when a sufficient number of SMEs are available in an organization. Therefore, a relevance value may be generated for the user query that may reverse the order of confidence score.

In accordance with some embodiments, the machine learning module 216 may also leverage resolution rate for the ranking model 516. The resolution rate may indicate that how many times a conversation system has provided a correct resolution for user queries.

In some implementations, the machine learning module 216 may generate one or more AI based hierarchical multi-conversation system (such as, the AI based hierarchical multi-conversation system 102) and store in the repository of conversation systems 506. Some implementations may be stored as a sub-tree of conversation systems and a tree may be formed on basis of what all domains the AI based hierarchical multi-conversation system 102 may be able to cater. In other words, this is quite flexible and maintained as a smaller unit and later on can be combined as and when a new domain or sub-domain related queries are dealt by the AI based hierarchical multi-conversation system 102.

In accordance with an embodiment, the AI based hierarchical multi-conversation system 102 may use the database 212 to store relationships between topic classification and individual conversation systems. In accordance with an embodiment, the database 212 may correspond to any graph-based database, but not limited to, Graph DB. It may possible that a user may ask the user query that doesn't belong to a conversation system configured in the AI based hierarchical multi-conversation system 102. In such a case, the AI based hierarchical multi-conversation system 102 may be configured to identify a domain of the user query and may identify a chat bot from internal repository (not shown in FIG. 5A) or an external chat bot.

After such identification by the AI based hierarchical multi-conversation system 102, the identified domain or chat bot may be added as a leaf child node in the hierarchical tree for AI based hierarchical multi-conversation system 102. The user queries for same may be added starting from a parent node to the root node of the hierarchical tree. In such a case, topic classification model (or classification-based machine learning model) at each level may be trained to accommodate a new model.

In some embodiments, the AI based hierarchical multi-conversation system 102 may be configured to implement versioning of a conversation system and classification-based machine learning model such that old model (classification-based machine learning model) need not be replaced until highly efficient new model (classification-based machine learning model) with new data is ready.

FIG. 6A is a tabular representation of a sample dataset (training data) for intent classification of user queries, in accordance with an embodiment. With reference to FIG. 6A, there is shown a tabular representation 600A with columns, namely, user query or variation 602 and intent 604.

The machine learning module 216 of the AI based hierarchical multi-conversation system 102 may be configured to identify an intention (intent) of a user from a user query using the first pre-trained machine learning model. In accordance with an embodiment, the first pre-trained machine learning model may be trained to identify the intent of the user from the user query.

Referring to FIG. 6A, the two user queries are "Please tell me about hyperparameters in AI models" and "What are Natural Language Processing (NLP) techniques?". The intention of the user from the two user queries (user query or variation 602) may be to find out information related to hyperparameters in models and NLP techniques respectively. Therefore, the machine learning module 216 of the AI based hierarchical multi-conversation system 102 may be configured to identify the intention of associated user from the two user queries as "Information" using the first pre-trained machine learning model.

In accordance with an embodiment, the machine learning module 216 of the AI based hierarchical multi-conversation system 102 may be configured to implement intent classification-based machine learning models that are trained to identify an intention (intent) of a user from a user query. In accordance with an embodiment, services from cloud vendors also provide GUI to implement intent classification systems.

Figure 6B:
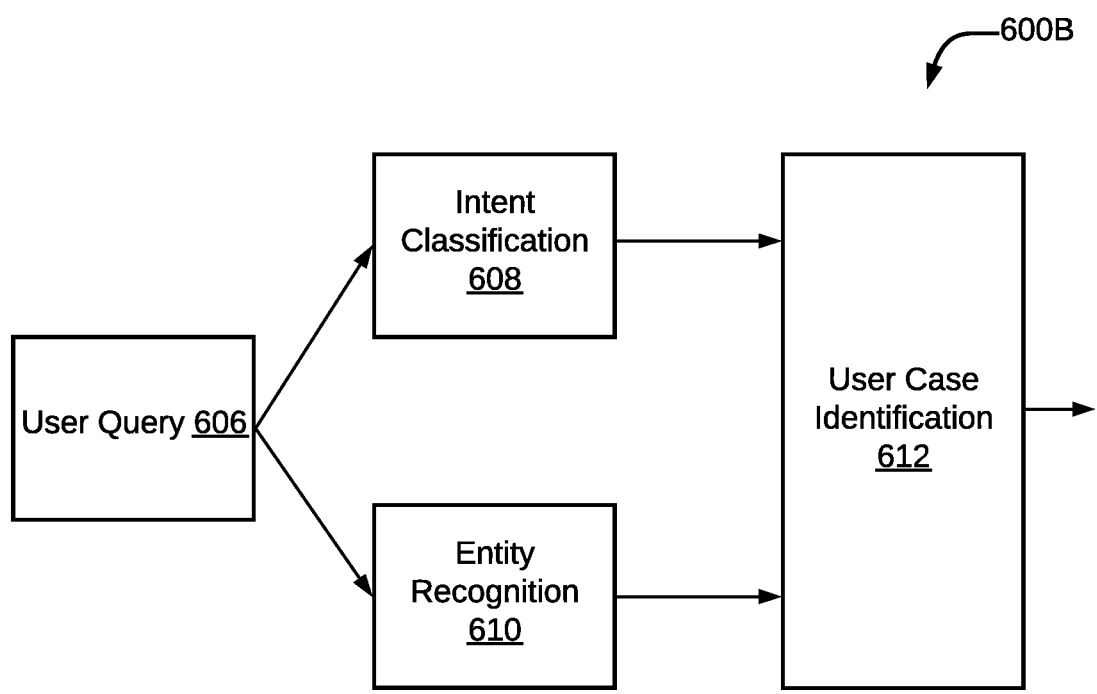
FIG. 6B is a block diagram that illustrates intent classification and entity classification of user queries by AI based hierarchical multi-conversation system, in accordance with an embodiment.

FIG. 6B is a block diagram that illustrates intent classification and entity classification of user queries by AI based hierarchical multi-conversation system, in accordance with an embodiment. With reference to FIG. 6B, there is shown a block diagram 600B with a user query 606, an intent classification 608, an entity recognition 610 and a use case identification 612.

The machine learning module 216 of the AI based hierarchical multi-conversation system 102 may be configured to identify an intention (intent) of a user from the user query 606 and to identify entity of the user from the user query 606 using the first pre-trained machine learning model. In accordance with an embodiment, the first pre-trained machine learning model may be trained to identify the intent of the user by intent classification 608 and to recognize the entity by the entity recognition 610 from the user query 606. For example, as referred in tabular representation 600A, the NLP and the hyperparameters are entities. Therefore, a combination of "intent" and "entities" may initiate correct conversation (the user case identification 612) with a user to trigger conversation for identified use case.

In accordance with an embodiment, the AI based hierarchical multi-conversation system 102 may leverage entity recognition services provided by third party service provider/cloud vendors. In some embodiments, the AI based hierarchical multi-conversation system 102 may also implement own entity recognition system based on sequence learning using Neural Network models, such as, but not limited to LSTM and Markov models.

In some embodiments, the AI based hierarchical multi-conversation system 102 may integrate with topic classification systems using REST APIs (Representational State Transfer Application Programming Interface) or by directly calling a function from the topic classification systems.

In some embodiments, the AI based hierarchical multi-conversation system 102 may implement or integrate with any Dashboard systems, such as, but not limited to Kibana, Tableau, SAP BI that enables SMEs to check for any issues at any level of the AI based hierarchical multi-conversation system 102. This may also populate newly discovered conversation system from the repository of conversation systems 506.

Figure 7:
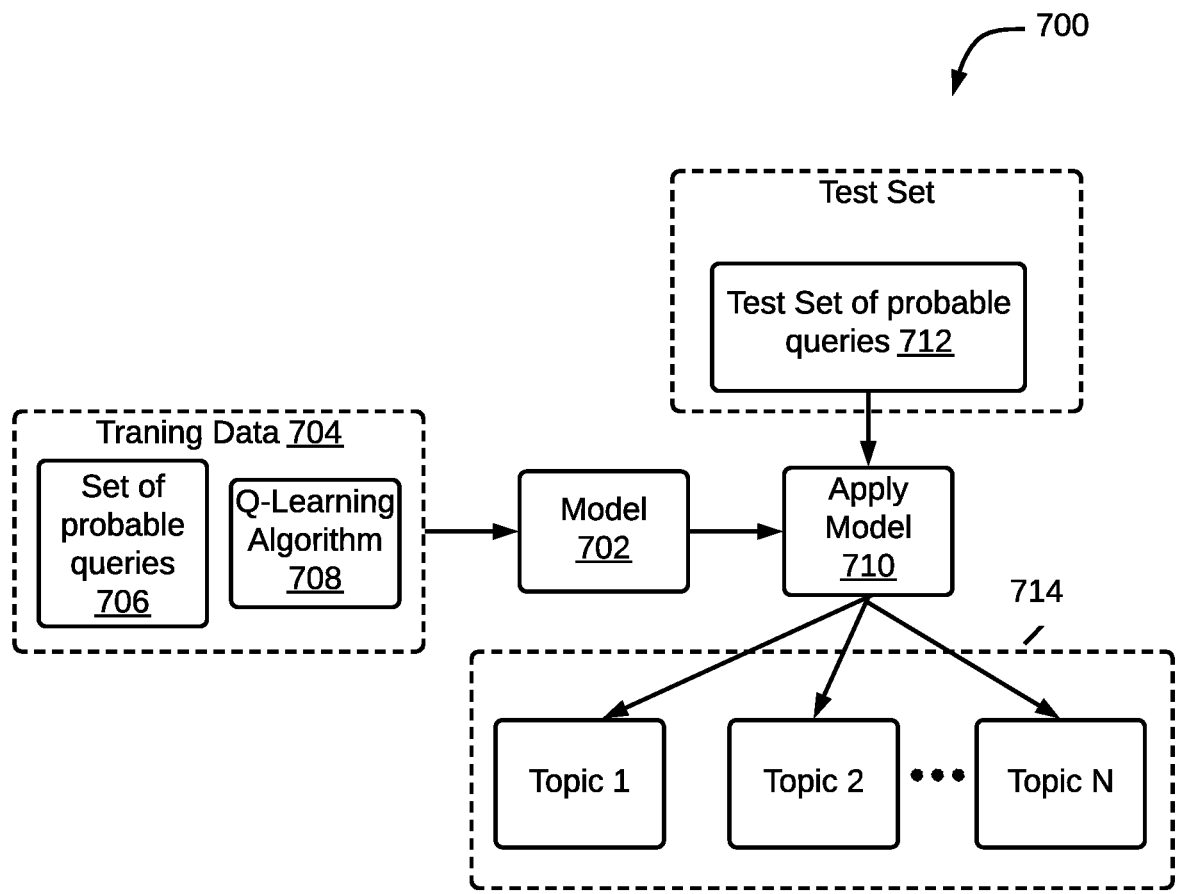
FIG. 7 is a block diagram that illustrates training AI based hierarchical multi-conversation system based on reinforcement learning, in accordance with an exemplary embodiment.

FIG. 7 is a block diagram that illustrates training AI based hierarchical multi-conversation system based on reinforcement learning, in accordance with an exemplary embodiment. FIG. 7 is explained in conjunction with elements from FIG. 1 to FIG. 6B.

With reference to FIG. 7, there is shown a model 702, training data 704 with a set of probable queries 706, Q-learning algorithm 708, apply model 710, a test set of probable queries 712, and a plurality of topics (topic 1, topic 2 up to topic N) 714. In accordance with an embodiment, the model 702 may correspond to a trained AI based hierarchical multi-conversation system, such as, the AI based hierarchical multi-conversation system 102. In accordance with an embodiment, the model 702 may be exposed to new training data 704 when the model 702 has never been through earlier training process. The model 702 may leverage AI based code reusability system to generate code snippets in various languages and technologies. The code snippets may be generated for modules of dummy products similar to the ones developed by developers.

The AI based hierarchical multi-conversation system 102 may use any topic generation algorithm to generate topics based on relevancy and identify relationship either using any available lexical database or directly identify from corpus of documents. The AI based hierarchical multi-conversation system 102 may use Natural Language Generation methodologies to generate probable queries or questions (such as, a test set of probable queries 712) from documents that could be answered by corpus of documents. Thereafter, a list of sentences may be available that could be user queries and a tree structure that may represent topic hierarchies.

The machine learning module 216 of the AI based hierarchical multi-conversation system 102 may be configured to extract all complete paths of a hierarchical tree, starting from a root node to a leaf child node. Such paths may represent probable routes that a user query may follow.

Each node (such as, the root node, internal nodes and leaf child nodes) in the hierarchical tree may correspond to a state in a reinforcement learning algorithm and a successor node in the hierarchical tree may correspond to a next state of an agent after performing required action. The action may refer to a user query that may be classified using topic classification (from classification-based machine learning model) at a particular node and may take route to a next level of nodes depending on computed confidence score for the same.

An example of the Reinforcement Learning technique may include, but not limited to, a temporal difference algorithm. In accordance with an embodiment, the Reinforcement Learning technique may be used to calculate Q-value for different states corresponding to the user query to find optimal conversation system from the multi-conversation system that could answer the user query using defined policy associated with an organization.

In some embodiments, the AI based hierarchical multi-conversation system 102 may use pro-active learning techniques to select probable list of question or queries (such as, the test set of probable queries 712) that may need labelling from one or more SMEs via the live agent system 108. The one or more SMEs associated with the live agent system 108 may label or map user queries with topics. Further, a pertinent objective of using the Reinforcement Learning technique may be to optimize a reward function, that is, to select a path in the hierarchical tree from a set of paths that may maximize a reward for the user query. This may facilitate generation of the training data 704 for the plurality of topics (topic 1, topic 2 up to topic N) 714 or sub-topics in the set of paths of the hierarchical tree.

In accordance with an embodiment, the AI based hierarchical multi-conversation system 102 may penalize the model 702 for the user query when a current path in the hierarchical tree is incorrect for a current user query. In accordance with an embodiment, Q-values are generated by the model 702 by using the Q-Learning algorithm 708 for all user queries to optimize reward function.

Figure 8:
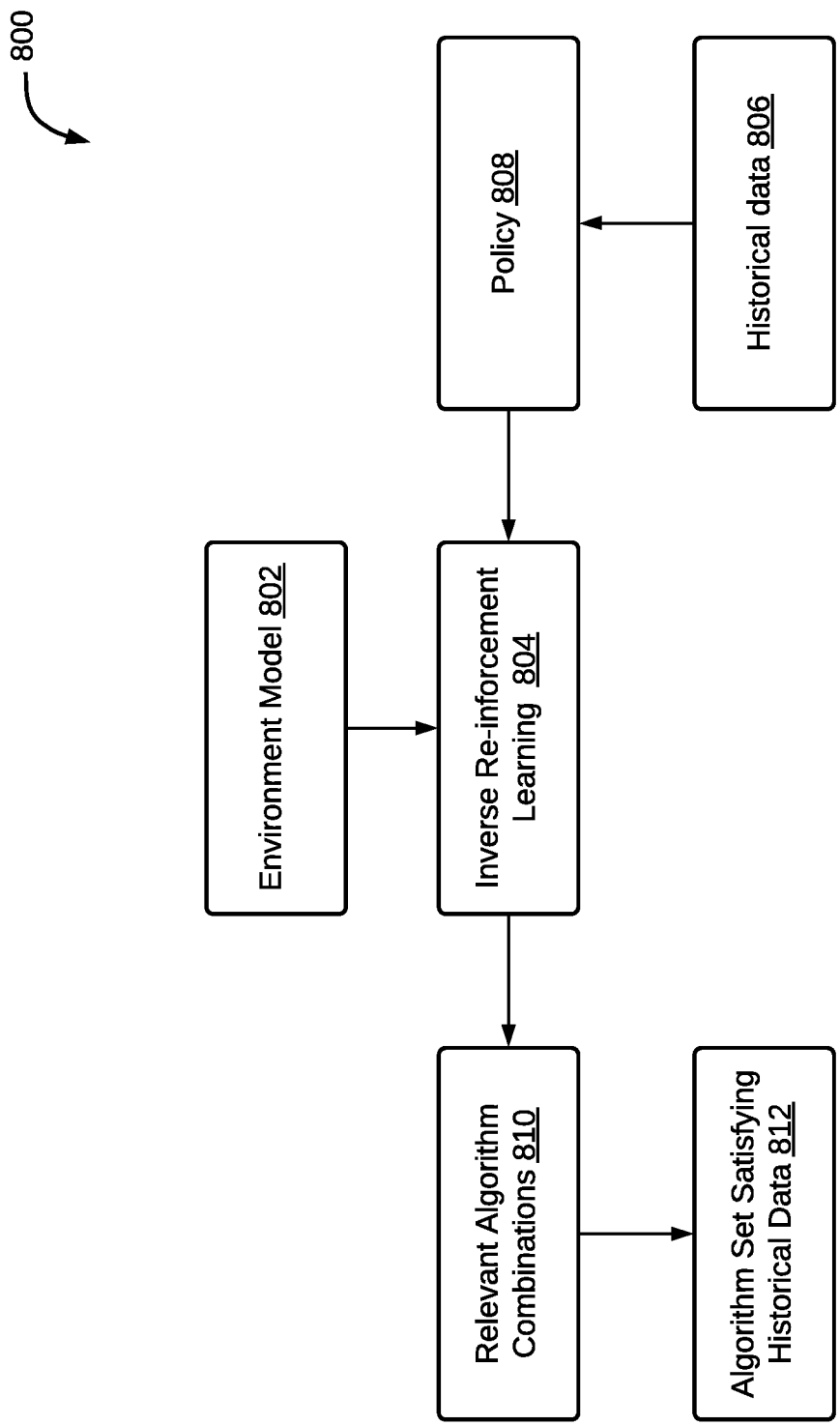
FIG. 8 is a block diagram for a trained AI based hierarchical multi-conversation system that uses inverse reinforcement learning technique, in accordance with an exemplary embodiment.

FIG. 8 is a block diagram for a trained AI based hierarchical multi-conversation system that uses inverse reinforcement learning technique, in accordance with an exemplary embodiment. FIG. 8 is explained in conjunction with elements from FIG. 1 to FIG. 7. There is shown an environmental model 802, an inverse reinforcement learning 804, historical data 806, policy 808, relevant algorithm combinations 810, and algorithm set satisfying historical data 812.

The AI based hierarchical multi-conversation system 102 trained with reinforcement learning may correspond to the environment model 802. The environment model 802 may correspond to the apply model 710. The environment model 802 may employ the inverse reinforcement learning 804. The historical data 806 may include detailed information about all user queries that have been answered by chat bots, conversation systems from the AI based hierarchical multi-conversation system 102 and/or human operators (such as, one or more SMEs). In accordance with an embodiment, the historical data 806 may include information of categories associated with the user queries. This information may also include training data that may have been prepared in any of implementations of the AI based hierarchical multi-conversation system 102.

In accordance with an embodiment, the inverse reinforcement learning 804 may be used in case architecture of the AI based hierarchical multi-conversation system 102 needs to be changed on basis of historical information, such as, historical records 808. Such change in the architecture of the AI based hierarchical multi-conversation system 102 may be further used for reinforcement learning algorithms.

In accordance with an embodiment, the AI based hierarchical multi-conversation system 102 may use a concept of Inverse Reinforcement Learning 804 to find a combination, a set of algorithms or a function that may define architecture of deep learning based recurrent neural network variations and define hyperparameter for different layers of graph based neural networks. In some embodiments, the AI based hierarchical multi-conversation system 102 may recommend more than one combination of algorithms or architecture that can be vet by using Reinforcement Learning technique later. The AI based hierarchical multi-conversation system 102 may recommend optimal values of the hyperparameters corresponding to each combination of algorithms.

The hyperparameters values may be validated against the historical data 806 from an existing environment model 806 and may correspond to a model hyperparameter tuning. The AI based hierarchical multi-conversation system 102 may select algorithm combination to provide optimal architecture of a graph based neural network, a recurrent neural network architecture and a ranking based neural network architecture to generate a machine learning model for the AI based hierarchical multi-conversation system 102.

In some embodiments, the AI based hierarchical multi-conversation system 102 may use a Transfer Learning technique to gather knowledge from an existing environment or implementation of the AI based hierarchical multi-conversation system 102. The knowledge may correspond to optimal values of model parameters and the hyperparameters for implementation. The AI based hierarchical multi-conversation system 102 may utilize optimal values of hyperparameter from an existing environment to a new environment instead of starting from scratch. This may require less training time as compared to starting from scratch or from vanilla model. The vanilla model may correspond to a standard, usual, and unfeatured version of the AI based hierarchical multi-conversation system 102. For example, the AI based hierarchical multi-conversation system 102 uses a graph or a hierarchical tree with relationships of topics along with topic classification and a conversation system at a leaf child node as a baseline for a new environment.

Figure 9:
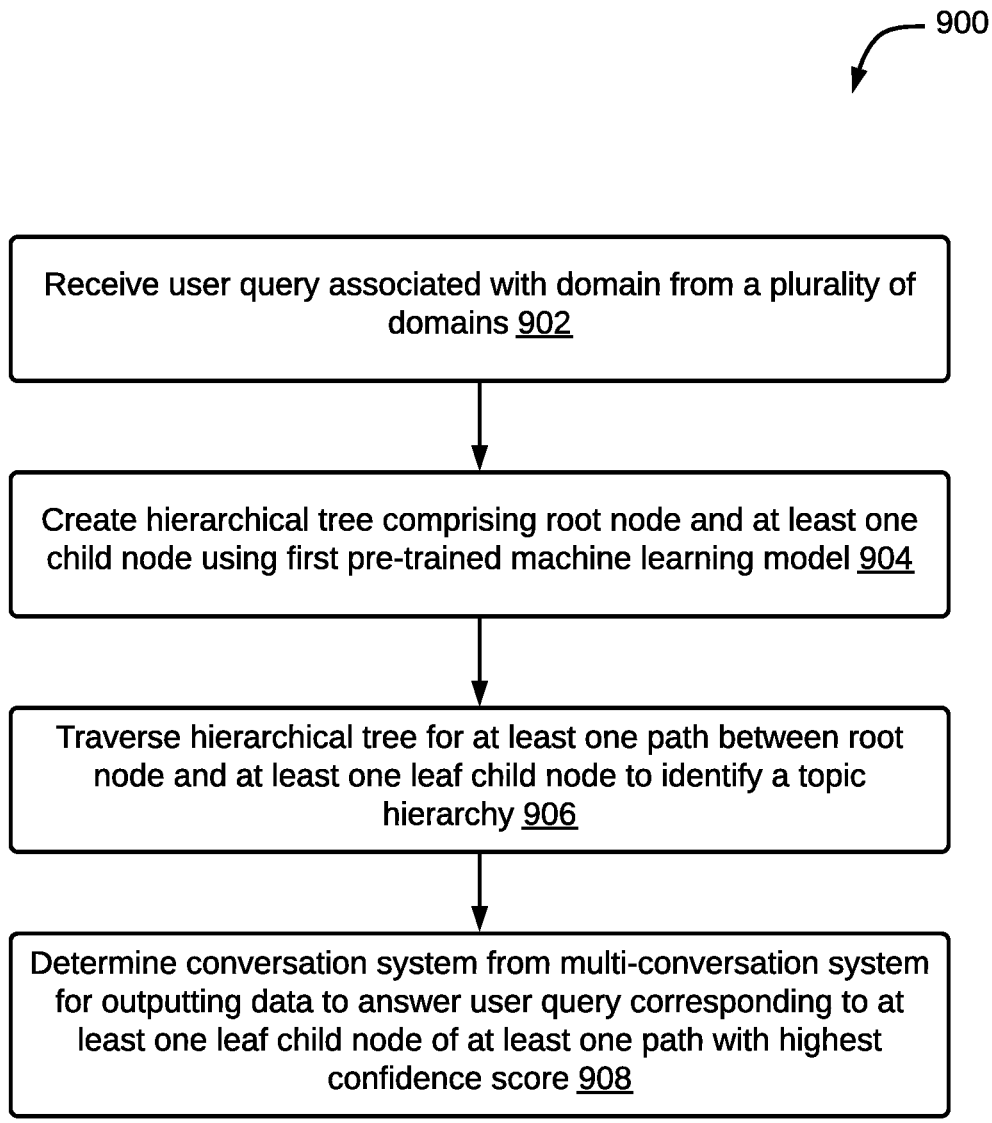
FIG. 9 is a flowchart that illustrates an exemplary method for determining a conversation system from a multi-conversation system using AI, in accordance with an embodiment.

FIG. 9 is a flowchart that illustrates an exemplary method for determining a conversation system from a multi-conversation system using AI, in accordance with an embodiment. With reference to FIG. 9, there is shown a flowchart 900. The operations of the exemplary method may be executed by any computing system, for example, by the AI based hierarchical multi-conversation system 102 of FIG. 1. The operations of the flowchart 900 may start at 902 and proceed to 904.

At 902, a user query associated with a domain from a plurality of domains may be received. In accordance with an embodiment, the AI based multi-conversation module 214 of the AI based hierarchical multi-conversation system 102 may be configured to receive the user query associated with the domain from the plurality of domains. In accordance with another embodiment, the AI based multi-conversation module 214 of the AI based hierarchical multi-conversation system 102 may be configured to mask confidential information from the received user query.

At 904, a hierarchical tree comprising a root node and at least one child node may be created. In accordance with an embodiment, the machine learning module 216 of the AI based hierarchical multi-conversation system 102 may be configured to create the hierarchical tree comprising the root node and the at least one child node using a first pre-trained machine learning model. The first pre-trained machine learning model may correspond to a classification machine learning model, such as, but not limited to, Long-Short-Term-Memory (LSTM) based models and Gated Recurring Units (GRU) based models. The at least one child node may be associated with match data corresponding to a topic related to the user query. The at least one leaf child node may be associated with match data corresponding to a sub-topic related to the user query.

In accordance with an embodiment, the first pre-trained machine learning model may be trained to extract relevant keywords from training data using word embedding algorithms. In accordance with an embodiment, the first pre-trained machine learning model may further be trained to identify variations in text of sentences associated with queries using Natural Language Processing algorithms and converting the identified variations into vector representation using sentence embedding algorithms. In accordance with an embodiment, the first pre-trained machine learning model may also be trained on historical conversation data associated with the multi-conversation system. In accordance with an embodiment, the first pre-trained machine learning model may be trained to identify an intention of a user from the user query as described in detailed description of FIGS. 6A and 6B.

In accordance with an embodiment, the machine learning module 216 of the AI based hierarchical multi-conversation system may be configured to modify the first pre-trained machine learning model with transferable knowledge for a target system to be evaluated. The transferable knowledge may correspond to optimal values of model parameters associated with the nodes of the at least one path for the hierarchical tree. In accordance with an embodiment, the machine learning module 216 of the AI based hierarchical multi-conversation system may be configured to tune the first pre-trained machine learning model using specific characteristics of the target system to create a target model. In accordance with an embodiment, the machine learning module 216 of the AI based hierarchical multi-conversation system may be configured to evaluate the target system performance using the target model to predict system performance of the target system.

At 906, the hierarchical tree may be traversed for at least one path between the root node and the at least one leaf child node to identify a topic hierarchy. In accordance with an embodiment, the machine learning module 216 of the AI based hierarchical multi-conversation system 102 may be configured to traverse the hierarchical tree for at least one path between the root node and the at least one leaf child node to identify the topic hierarchy. In accordance with an embodiment, the at least one path may be associated with a confidence score corresponding to mapping between the user query and the match data of nodes in the at least one path. The mapping between the user query and the match data of nodes in the at least one path may be as per the relevancy of the user query to the topic at nodes in the at least one path. The computation of the confidence score is described in detail of FIG. 11.

In accordance with another embodiment, the I/O device 206 of the AI based hierarchical multi-conversation system 102 may be configured to receive an input from at least one of a user or an expert (also referred as an SME), via a graphical user interface, for variation of the topic or the sub-topic associated with the user query to identify the topic hierarchy in the hierarchical tree. The variation of the topic or the sub-topic associated with the user query is described in detail for FIG. 4A-4C.

In accordance with an embodiment, traversing the hierarchical tree for the at least one path between the root node and the at least one leaf child node to identify the topic hierarchy may be based on a reinforcement learning algorithm. In accordance with an embodiment, the machine learning module 216 of the AI based hierarchical multi-conversation system may be configured to calculate Q value using the reinforcement learning algorithm for nodes corresponding to the at least one path to find optimal conversation system to answer the user query using a defined policy associated with an organization. In accordance with an embodiment, the Q value may generate an estimated future reward from the user query (user queries).

At 908, the conversation system may be determined from the multi-conversation system for outputting data to answer the user query corresponding to the at least one leaf child node of the at least one path with a highest confidence score. In accordance with an embodiment, the AI based multi-conversation module 214 of the AI based hierarchical multi-conversation system 102 may be configured to determine the conversation system from the multi-conversation system for outputting data to answer the user query corresponding to the at least one leaf child node of the at least one path with a highest confidence score.

In accordance with an embodiment, for outputting data to answer the user query, the user response may be transmitted to the user 112 in a text format, image format, video format or a recorded audio format.

In accordance with an embodiment, the conversation system may be determined from the plurality of conversation systems based on an inverse reinforcement learning algorithm by defining hyperparameters for a plurality of layers of the first pre-trained machine learning model using the inverse reinforcement learning algorithm. In accordance with an embodiment, the AI based multi-conversation module 214 of the AI based hierarchical multi-conversation system 102 may be configured to implement the determined conversation system using a cognitive chatbot service for outputting the data.

Figure 10:
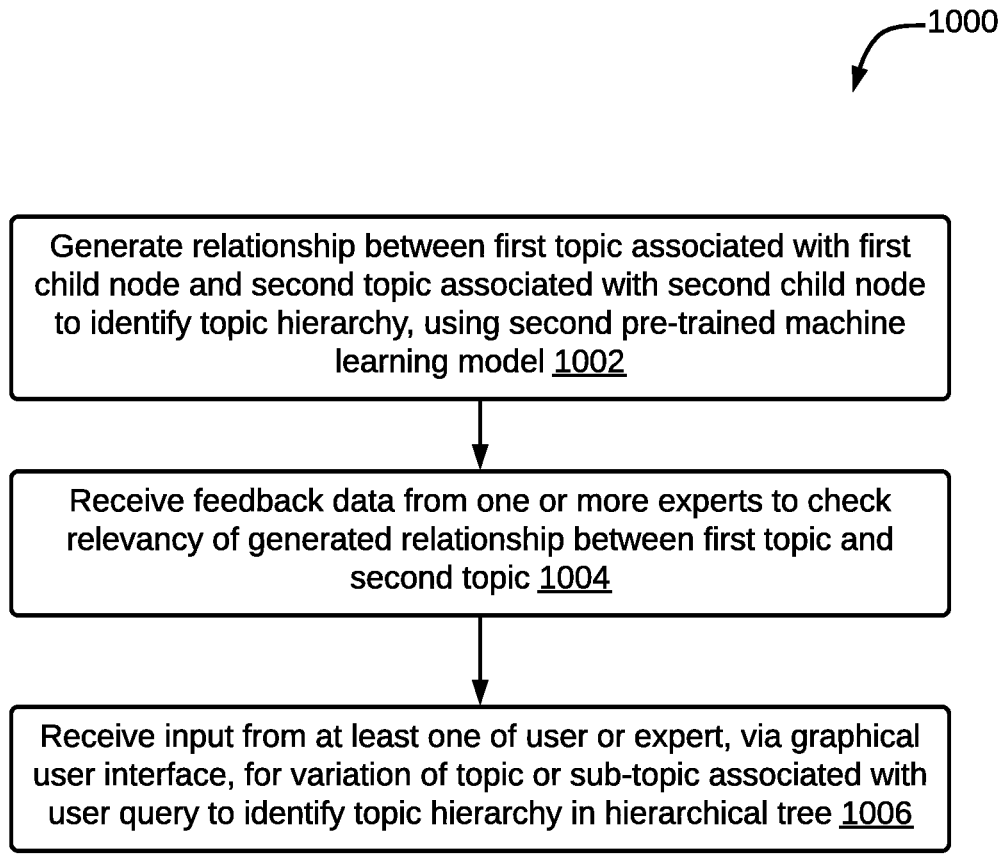
FIG. 10 is a flowchart that illustrates an exemplary method for creating a hierarchical tree for determination of a conversation system from a multi-conversation system using AI, in accordance with an embodiment

FIG. 10 is a flowchart that illustrates an exemplary method for creating a hierarchical tree for determination of a conversation system from a multi-conversation system using AI, in accordance with an embodiment. With reference to FIG. 10, there is shown a flowchart 1000. The operations of the exemplary method may be executed by any computing system, for example, by the AI based hierarchical multi-conversation system 102 of FIG. 1. The operations of the flowchart 1000 may start at 1002 and proceed to 1004. With reference to FIG. 9, after creating the hierarchical tree comprising a root node and at least one child node as mentioned in 904, the following steps may take place.

At 1002, a relationship between a first topic associated with a first child node and a second topic associated with a second child node may be generated to identify the topic hierarchy, using a second pre-trained machine learning model. In accordance with an embodiment, the machine learning module 216 of the AI based hierarchical multi-conversation system 102 may be configured to generate the relationship between the first topic associated with the first child node and the second topic associated with the second child node to identify the topic hierarchy, using the second pre-trained machine learning model. In accordance with an embodiment, the second pre-trained machine learning model may correspond to a graph based neural network model. In accordance with an embodiment, the second pre-trained machine learning model may be trained on feedback data from the one or more experts (one or more SMEs) to check relevancy of the generated relationship.

At 1004, feedback data may be received from one or more experts to check relevancy of the generated relationship between the first topic and the second topic, wherein the expert selects a pair of topics or sub-topics for incorrect relevancy of the generated relationship. In accordance with an embodiment, the machine learning module 216 of the AI based hierarchical multi-conversation system 102 may be configured to receive feedback data from an expert of one or more experts to check relevancy of the generated relationship between the first topic and the second topic. The expert may select a pair of topics or sub-topics for incorrect relevancy of the generated relationship.

At 1006, an input may be received from at least one of a user or an expert, via a graphical user interface, for variation of the topic or the sub-topic associated with the user query to identify the topic hierarchy in the hierarchical tree. In accordance with an embodiment, the machine learning module 216 may be configured to receive the input from at least one of the user or the expert, via the graphical user interface, for variation of the topic or the sub-topic associated with the user query to identify the topic hierarchy in the hierarchical tree.

Figure 11:
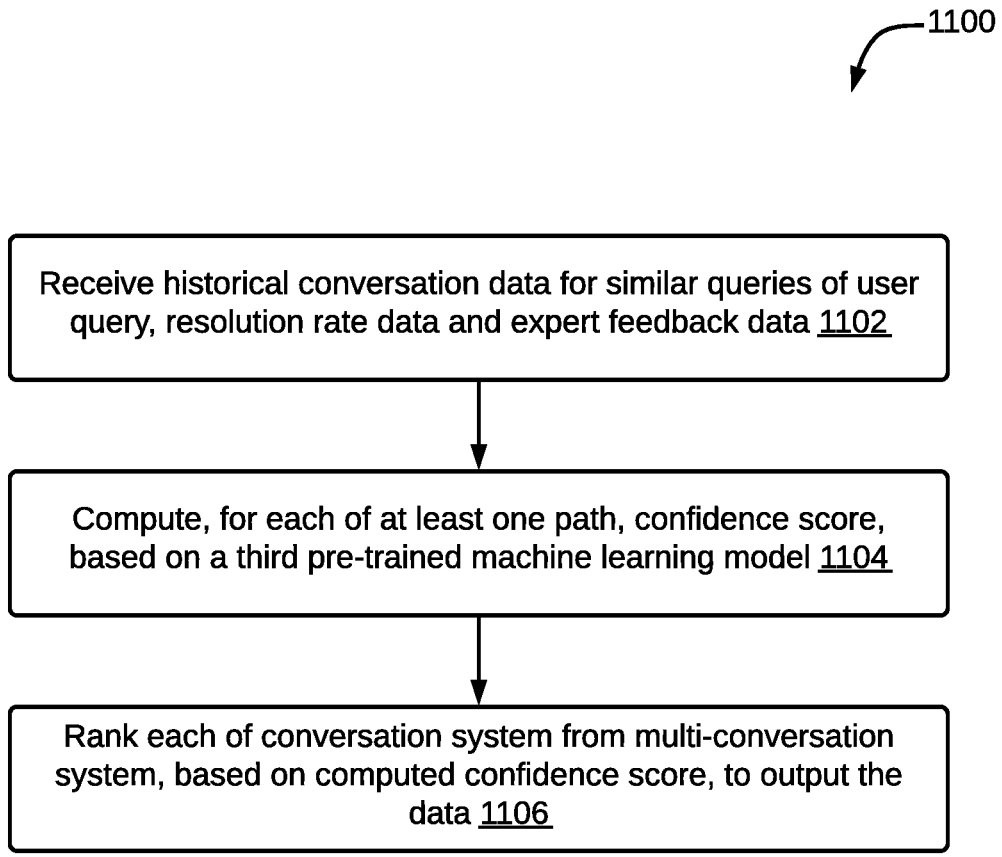
FIG. 11 is a flowchart that illustrates an exemplary method for ranking each of conversation system from a multi-conversation system using AI, in accordance with an embodiment.

FIG. 11 is a flowchart that illustrates an exemplary method for ranking each of conversation system from a multi-conversation system using AI, in accordance with an embodiment. With reference to FIG. 11, there is shown a flowchart 1100. The operations of the exemplary method may be executed by any computing system, for example, by the AI based hierarchical multi-conversation system 102 of FIG. 1. The operations of the flowchart 1100 may start at 1102 and proceed to 1104. With reference to FIG. 9, for traversing the hierarchical tree for at least one path associated with a confidence score as mentioned in 906, the following steps may take place.

At 1102, historical conversation data for similar queries of the user query, resolution rate data and expert feedback data may be received. In accordance with an embodiment, the I/O devices 206 of the AI based hierarchical multi-conversation system 102 may be configured to receive the historical conversation data for similar queries of the user query, the resolution rate data and the expert feedback data. The resolution rate data may correspond to correct resolution of user queries.

At 1104, for each of the at least one path, the confidence score may be computed, based on a third pre-trained machine learning model. In accordance with an embodiment, the machine learning module 216 of the AI based hierarchical multi-conversation system may be configured to compute, for each of the at least one path, the confidence score, based on a third pre-trained machine learning model. The third machine learning model may be trained on the historical conversation data, the resolution rate data and the expert feedback data. An example of the third pre-trained machine learning model may include, but not limited to, a RankNet model.

At 1106, each of the conversation system may be ranked from the multi-conversation system, based on the computed confidence score, to output the data. In accordance with an embodiment, the machine learning module 216 of the AI based hierarchical multi-conversation system 102 may be configured to rank each of the conversation system from the multi-conversation system, based on the computed confidence score, to output the data. For example, when a same user query has been asked several times and the same response has been provided, the machine learning module 216 may generate a result that may be provided to the user (or an SME) with a confidence score.

In accordance with an embodiment, an unanswered user query may have a low confidence score. For a generated result from previous user queries that had been used a few times, such as below a threshold number, the confidence score may be medium. For a generated result based upon many similar user responses, the confidence score may be high.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for determining a conversation system from a multi-conversation system using Artificial Intelligence (AI), the method comprising:

receiving, by an AI based hierarchical multi-conversation system, a user query associated with a domain from a plurality of domains;

creating, by the AI based hierarchical multi-conversation system, a hierarchical tree comprising a root node and at least one child node using a first pre-trained machine learning model, wherein the at least one child node is associated with match data corresponding to a topic related to the user query, and wherein at least one leaf child node is associated with match data corresponding to a sub-topic related to the user query;

traversing, by the AI based hierarchical multi-conversation system, the hierarchical tree for at least one path between the root node and the at least one leaf child node to identify a topic hierarchy based on a reinforcement learning algorithm,
  wherein identifying the topic hierarchy further comprises:
    generating a relationship between a first topic associated with a first child node and a second topic associated with a second child node, using a second pre-trained machine learning model;
    checking relevancy of the generated relationship between the first topic and the second topic based on feedback data received from an expert from one or more experts, wherein the expert selects a pair of topics or sub-topics for incorrect relevancy of the generated relationship; and
    determining variation of the topic or the sub-topic associated with the user query based on input received from at least one of a user or an expert, via a graphical user interface; and
  wherein the at least one path is associated with a confidence score corresponding to mapping between the user query and the match data of nodes in the at least one path; and
determining, by the AI based hierarchical multi-conversation system, the conversation system from the multi-conversation system for outputting data to answer the user query corresponding to the at least one leaf child node of the at least one path with a highest confidence score.

2. The method of claim 1, wherein the first pre-trained machine learning model is trained to extract relevant keywords from training data using word embedding algorithms.

3. The method of claim 2, wherein the first pre-trained machine learning model is further trained to identify variations in text of sentences associated with queries using Natural Language Processing algorithms and converting the identified variations into vector representation using sentence embedding algorithms.

4. The method of claim 3, wherein the first pre-trained machine learning model is trained on historical conversation data associated with the multi-conversation system.

5. The method of claim 4, wherein the first pre-trained machine learning model is trained to identify an intention of a user from the user query.

6. The method of claim 1, further comprising masking confidential information from the received user query to create the hierarchical tree.

7. The method of claim 1, further comprising:
receiving historical conversation data for similar queries of the user query, resolution rate data and expert feedback data, wherein the resolution rate data;
computing, for each of the at least one path, the confidence score, based on a third pre-trained machine learning model, wherein the third machine learning model is trained on the historical conversation data, the resolution rate data and expert feedback data; and
ranking each of the conversation system from the multi-conversation system, based on the computed confidence score, to output the data.

8. The method of claim 1, further comprising implementing the conversation system using a cognitive chatbot service for outputting the data.

9. The method of claim 1, further comprising calculating Q value using the reinforcement learning algorithm for nodes corresponding to the at least one path to find optimal conversation system to answer the user query using a defined policy associated with an organization, wherein the Q value generates an estimated future reward from the user query.

10. The method of claim 1, wherein determining the conversation system from the plurality of conversation systems is based on an inverse reinforcement learning algorithm and the method further comprising defining hyperparameters for a plurality of layers of the first pre-trained machine learning model using the inverse reinforcement learning algorithm.

11. The method of claim 1, further comprising:
modifying the first pre-trained machine learning model with transferable knowledge for a target system to be evaluated, wherein the transferable knowledge corresponds to optimal values of model parameters associated with the nodes of the at least one path for the hierarchical tree;
tuning the first pre-trained machine learning model using specific characteristics of the target system to create a target model; and
evaluating the target system performance using the target model to predict system performance of the target system.

12. A system for determining a conversation system from a multi-conversation system using Artificial Intelligence (AI), the system comprising:
a processor; and
a memory communicatively coupled to the processor, wherein the memory stores processor executable instructions, which, on execution, causes the processor to:
  receive a user query associated with a domain from a plurality of domains;
  create a hierarchical tree comprising a root node and at least one child node using a first pre-trained machine learning model, wherein the at least one child node is associated with match data corresponding to a topic related to the user query, and wherein at least one leaf child node is associated with match data corresponding to a sub-topic related to the user query;
  traverse the hierarchical tree for at least one path between the root node and the at least one leaf child node to identify a topic hierarchy based on a reinforcement learning algorithm,
  wherein identifying the topic hierarchy further comprises:
    generating a relationship between a first topic associated with a first child node and a second topic associated with a second child node, using a second pre-trained machine learning model;
    checking relevancy of the generated relationship between the first topic and the second topic based on feedback data received from an expert from one or more experts, wherein the expert selects a pair of topics or sub-topics for incorrect relevancy of the generated relationship; and
    determining a variation of the topic or the sub-topic associated with the user query based on input received from at least one of a user or an expert, via a graphical user interface; and
  wherein the at least one path is associated with a confidence score corresponding to mapping between the user query and the match data of nodes in the at least one path; and determine the conversation system from the multi-conversation system for outputting data to answer the user query corresponding to the at least one leaf child node of the at least one path with a highest confidence score.

13. The system of claim 12, wherein the processor executable instructions cause the processor to mask confidential information from the received user query to create the hierarchical tree.

14. The system of claim 12, wherein the processor executable instructions cause the processor to:
receive historical conversation data for similar queries of the user query, resolution rate data and expert feedback data, wherein the resolution rate data corresponds to correct resolution of queries asked by users;
compute, for each of the at least one path, the confidence score, based on a third machine learning model, wherein the third machine learning model is trained on the historical conversation data, the resolution rate data and expert feedback data; and
rank each of the conversation system from the multi-conversation system, based on the computed confidence score, to output the data.

15. A non-transitory computer-readable medium storing computer-executable instructions for determining a conversation system from a multi-conversation system using Artificial Intelligence (AI), the stored instructions, when executed by a processor, cause the processor to perform operations comprising:
receiving a user query associated with a domain from a plurality of domains;
creating a hierarchical tree comprising a root node and at least one child node using a first pre-trained machine learning model, wherein the at least one child node is associated with match data corresponding to a topic related to the user query, and wherein at least one leaf child node is associated with match data corresponding to a sub-topic related to the user query;
traversing the hierarchical tree for at least one path between the root node and the at least one leaf child node to identify a topic hierarchy based on a reinforcement learning algorithm,
wherein identifying the topic hierarchy further comprises:
generating a relationship between a first topic associated with a first child node and a second topic associated with a second child node, using a second pre-trained machine learning model;
checking relevancy of the generated relationship between the first topic and the second topic based on feedback data received from an expert from one or more experts, wherein the expert selects a pair of topics or sub-topics for incorrect relevancy of the generated relationship; and
determining a variation of the topic or the sub-topic associated with the user query based on input received from at least one of a user or an expert, via a graphical user interface; and
wherein the at least one path is associated with a confidence score corresponding to mapping between the user query and the match data of nodes in the at least one path; and
determining the conversation system from the multi-conversation system for outputting data to answer the user query corresponding to the at least one leaf child node of the at least one path with a highest confidence score.

* * * * *